(12) United States Patent
Hunzinger

(10) Patent No.: US 9,015,096 B2
(45) Date of Patent: Apr. 21, 2015

(54) CONTINUOUS TIME SPIKING NEURAL NETWORK EVENT-BASED SIMULATION THAT SCHEDULES CO-PENDING EVENTS USING AN INDEXABLE LIST OF NODES

(75) Inventor: Jason Frank Hunzinger, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 13/483,876

(22) Filed: May 30, 2012

(65) Prior Publication Data
US 2013/0325765 A1    Dec. 5, 2013

(51) Int. Cl.
G06F 17/00    (2006.01)
G06N 3/02    (2006.01)
G06N 3/04    (2006.01)

(52) U.S. Cl.
CPC . *G06N 3/02* (2013.01); *G06N 3/049* (2013.01)

(58) Field of Classification Search
USPC ............................................ 706/12, 45, 62
See application file for complete search history.

(56) References Cited

U.S. PATENT DOCUMENTS

| | | | |
|---|---|---|---|
| 5,787,408 A | 7/1998 | Deangelis | |
| 6,581,048 B1 | 6/2003 | Werbos | |
| 6,968,327 B1 | 11/2005 | Kates et al. | |
| 7,080,053 B2 | 7/2006 | Adams et al. | |
| 7,430,546 B1 | 9/2008 | Suri | |
| 7,788,109 B2 | 8/2010 | Jakobson et al. | |
| 7,941,392 B2 | 5/2011 | Saphir | |
| 2008/0147580 A1 | 6/2008 | Pannese | |
| 2010/0057662 A1 | 3/2010 | Collier et al. | |
| 2010/0235310 A1 | 9/2010 | Gage et al. | |
| 2010/0312730 A1 | 12/2010 | Weng et al. | |
| 2010/0312736 A1 | 12/2010 | Kello | |
| 2012/0011088 A1 | 1/2012 | Aparin et al. | |
| 2012/0259804 A1 | 10/2012 | Brezzo et al. | |
| 2013/0204814 A1* | 8/2013 | Hunzinger et al. | 706/16 |
| 2013/0204819 A1* | 8/2013 | Hunzinger et al. | 706/25 |
| 2013/0204820 A1* | 8/2013 | Hunzinger et al. | 706/25 |
| 2013/0304681 A1 | 11/2013 | Hunzinger et al. | |

(Continued)

FOREIGN PATENT DOCUMENTS

| | | |
|---|---|---|
| TW | I345899 B | 7/2011 |
| TW | I352805 B | 11/2011 |
| WO | WO-2012006470 | 1/2012 |

OTHER PUBLICATIONS

Brette et al.,"Simulation of networks of spiking neurons: A review of tools and strategies," Springer, Journal of Computational Neuroscience, vol. 23, pp. 349-398, 2007.

(Continued)

*Primary Examiner* — David Vincent
(74) *Attorney, Agent, or Firm* — Rupit M. Patel

(57) ABSTRACT

Certain aspects of the present disclosure provide methods and apparatus for a continuous-time neural network event-based simulation that includes a multi-dimensional multi-schedule architecture with ordered and unordered schedules and accelerators to provide for faster event sorting; and a formulation of modeling event operations as anticipating (the future) and advancing (update/jump ahead/catch up) rules or methods to provide a continuous-time neural network model. In this manner, the advantages include faster simulation of spiking neural networks (order(s) of magnitude); and a method for describing and modeling continuous time neurons, synapses, and general neural network behaviors.

60 Claims, 21 Drawing Sheets

(56) References Cited

U.S. PATENT DOCUMENTS

2013/0325767 A1    12/2013    Hunzinger
2014/0074761 A1    3/2014    Hunzinger

OTHER PUBLICATIONS

Cessac, et al. "Introducing numerical bounds to improve event-based neural network simulation," arXiv:0810.3992v2 [nlin.AO], last revised Mar. 20, 2009, pp. 1-29.

Ibarz, et al. "Map-based models in neuronal dynamics," Elsevier, Physics Reports 501 (2011), Dec. 16, 2010, pp. 1-74.

Neftci, et al. "Dynamic State and Parameter Estimation applied to Neuromorphic Systems," Institute of Informatics, University of Zurich and ETH Zurich, Zurich CH-8057, Switzerland, pp. 1-30.

Tanprasert et al., "Neuron and dendrite pruning by synaptic weight shifting in polynomial time," IEEE International Conference on Neural Networks, Jun. 1996, pp. 822-827, vol. 2.

Aguirre C. et al., "A Model of Spiking-Bursting Neuronal Behavior Using a Piecewise Linear Two-Dimensional Map", Jun. 18, 2005, Computational Intelligence and Bioinspired Systems, Lecture Notes In Computer Science (LNCS), Springer-Verlag, Berlin/Heidelberg, pp. 130-135, XP019010265, ISBN: 978-3-540-26208-4.

Bamford S.A., et al., "Synaptic rewiring for topographic mapping and receptive field development", Neural Networks, vol. 23, No. 4, Feb. 10, 2010, pp. 517-527, XP055100783, DOI: 10.1016/j.neunet. 2010.01.005 Sections 2 and 3.

Buchin A.Y., et al., "Firing-rate model of a population of adaptive neurons", Biophysics, vol. 55, No. 4, Aug. 1, 2010, pp. 592-599, XP055102045, ISSN: 0006-3509, DOI: 10.1134/S0006350910040135 p. 592-p. 599.

Clopath C., et al., "Connectivity reflects coding: a model of voltage-based STDP with homeostasis", Nature Neuroscience, vol. 13, No. 3, Jan. 24, 2010, pp. 344-352, XP055071136, DOI: 10.1038/nn.2479 Discussion Online methods.

Duda A.M., "NeuroXyce synapse device with STDP and stochastic transmission reliability", SAND report from Sandia National Laboratories, 2012, pp. 1-11, XP055100780, Retrieved from the Internet: URL: http://www.alexduda.com/2012_SAND.pdf [retrieved on Feb. 5, 2014] the whole document.

Hunzinger J.F., et al., "Learning complex temporal patterns with resource-dependent spike-timing-dependent plasticity", Journal of Neurophysiology (Articles in PresS), Apr. 11, 2012, pp. 58, XP055100784, DOI: 10.1152/jn.01150.2011 Retrieved from the Internet: URL: http://jn.physiology.org/content/early/2012/04/06/jn. 01150.2011.full.pdf [retrieved on Feb. 5, 2012] Resource model.

Izhikevich E. M. "Simple model of spiking neurons", IEEE Transactions on Neural Networks, Nov. 1, 2003, vol. 14, No. 6, pp. 1569-1572, IEEE Service Center, Piscataway, NJ, US, XP011105173, ISSN: 1045-9227, DOI: 10.1109/TNN.2003.820440.

Izhikevich E. M., "Which Model to Use for Cortical Spiking Neurons?", IEEE Transactions on Neural Networks, Sep. 1, 2004, vol. 15, No. 5, IEEE Service Center, Piscataway, NJ, US, pp. 1063-1070, XP011118568, ISSN: 1045-9227, DOI: 10.1109/TNN.2004. 832719.

Morrison A., et al., "Phenomenological models of synaptic plasticity based on spike timing", Biological Cybernetics, vol. 98, No. 6, Jun. 2008, pp. 459-478, XP019630139, DOI: 10.1007/s00422-008-0233-1 Sections 4 and 5.

Standage D., et al., "Probabilistic, weight-dependent STDP leads torate-dependent synaptic fixed points", Extended abstracts from the 15th annual Computational Neuroscience Meeting (CNS'06), Jul. 18, 2006, pp. 1-3, XP055100782, Retrieved from the Internet: URL: http://neuro.bstu.by/ai/To-dom/My_research/Papers-2.0/STDP/Learning-by-STDP/standage_trappenberg_cns06.pdf [retrieved on Jul. 19, 2011] the whole document.

Tonnelier, A., et al., "Some generalizations of integrate-and-fire models", Scientiae Mathematicae Japonicae Online, vol. 8, No. 14, 2003, pp. 509-516, XP055098449, ISSN: 1346-0447.

Coombes, S., et al., "Nonsmooth dynamics in spiking neuron models," Physica D: Nonlinear Phenomena, vol. 241, issue 22, Nov. 15, 2012, pp. 2042-2057.

Carandini., et al., "Summation and Division by Neurons in Primate Visual Cortex", Science, vol. 264, 1994, pp. 1333-1336.

International Search Report and Written Opinion—PCT/US2013/043390—ISA/EPO—Mar. 12, 2014.

Melero R C ., "Arquitecturas para el procesamineto de sistemas neuronales parael control de robots bioinspirados", Doctorado de la universidad de Granada, Oct. 8, 2007, XP055103251, Retrieved from the Internet: URL:http://hdl.handle.net/10481/1635 [retrieved on Oct. 26, 2009] Capitulos 3.

Mouraud A .,"Distributed for the event-driven simulation of spiking neural networks approach: application control of saccadic eye movements," The DAMNED Simulator for Implementing a Dynamic Model of the Network Controlling Saccadic Eye Movements, Jun. 29, 2009, XP055103248, Retrieved from internet:http://liris.cnrs.fr/Documents/Liris-4292.pdf p. 2-4.

Naud., et al., "Firing Patterns in the Adaptive Exponential Integrate-and-fire Model", Biol. Cybern, vol. 99, 2008, pp. 335-347.

Neumann M., "Yinspire: A performance efficient simulator for spiking neural nets", Thesis , University of Karlsruhe, May 8, 2008, XP055103254, Retrieved from internet http://www.ntecs.de/projects/documents/yinspirethesis/yinspirethesis.pdf, p. 2, 8, and 10.

Sanchez R R ., et al., "Simulacion eficiente de estructuras neuronales basadas en el si sterna nervioso", Doctorado de la universidad de Granada, Jul. 20, 2009, XP055103249, Retrieved from the Internet: URL:http://hdl.handle.net/10481/2404 [retrieved on Dec. 4, 2009] Capitulo 2.

Schaefer., et al., "Coincidence Detection in Pyramidal Neurons is Tuned by their Dendritic Branching Pattern", J. Neurophyiol, vol. 89, 2003, p. 3143-3154.

Scholze S ., et al., "A 32 GBit/s communication SoC for a waferscale neuromorphic system", Integration, The VLSI Journal, vol. 45, No. 1, Jun. 1, 2011, pp. 61-75, XP028324682, DOI: 10.1016/J.VLSI.2011. 05.003 Section 3.2.1.

Stewart R D ., et al., "Spiking neural network simulation: memory-optimal synaptic event scheduling", Journal of Computational Neuroscience, vol. 30, No. 3, Nov. 3, 2010, pp. 721-728, XP019912205, DOI: 10.1007/S10827-010-0288-6 Sections 2 and 4.

* cited by examiner

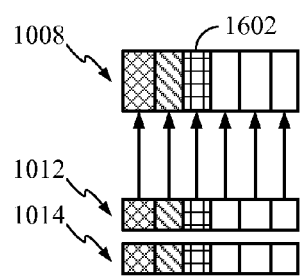
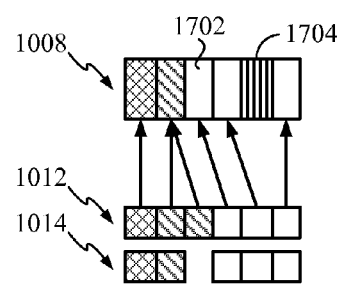
FIG. 19            FIG. 20
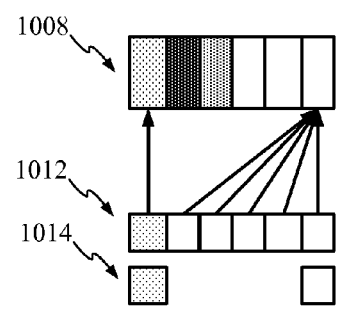
FIG. 21
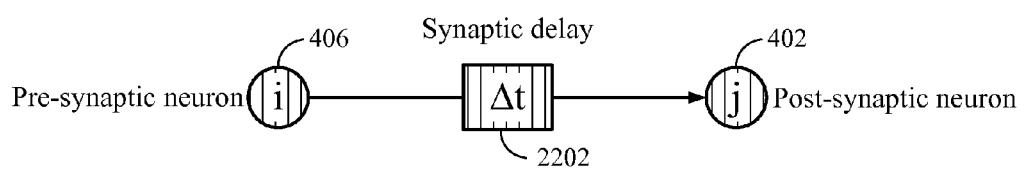
FIG. 22

CONTINUOUS TIME SPIKING NEURAL NETWORK EVENT-BASED SIMULATION THAT SCHEDULES CO-PENDING EVENTS USING AN INDEXABLE LIST OF NODES

BACKGROUND

1. Field

Certain aspects of the present disclosure generally relate to neural networks and, more particularly, to a continuous-time neural network event-based simulation.

2. Background

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type of artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

SUMMARY

Certain aspects of the present disclosure generally relate to a continuous-time neural network event-based simulation. In particular, certain aspects include a multi-dimensional multi-schedule architecture with ordered and unordered schedules and accelerators and a formulation of modeling event operations as anticipating (the future) and updating (jump ahead/catch up) rules or methods. The advantages are thus: faster simulation of spiking neural networks (order(s) of magnitude) and a method for describing and modeling continuous time neurons, synapses, and general neural network behaviors.

Certain aspects of the present disclosure provide a method for neural networks. The method generally includes scheduling a plurality of events for a plurality of nodes in a neural network using a multilevel scheme for faster processing of the events compared to a single level, ordered list of the events; and executing the scheduled plurality of events.

Certain aspects of the present disclosure provide an apparatus for neural networks. The apparatus generally includes a processing system configured to schedule a plurality of events for a plurality of nodes in a neural network using a multilevel scheme for faster processing of the events compared to a single level, ordered list of the events; and to execute the scheduled plurality of events.

Certain aspects of the present disclosure provide an apparatus for neural networks. The apparatus generally includes means for scheduling a plurality of events for a plurality of nodes in a neural network using a multilevel scheme for faster processing of the events compared to a single level, ordered list of the events; and means for executing the scheduled plurality of events.

Certain aspects of the present disclosure provide a computer-program product for neural networks. The computer-program product generally includes a computer-readable medium having instructions executable to schedule a plurality of events for a plurality of nodes in a neural network using a multilevel scheme for faster processing of the events compared to a single level, ordered list of the events; and to execute the scheduled plurality of events.

Certain aspects of the present disclosure provide a method for neural networks. The method generally includes receiving a first input event at a first node in a neural network, advancing a state of the first node based on the received first input event, and determining when, if ever, a first output event for the first node is expected to occur based on the advanced state of the first node.

Certain aspects of the present disclosure provide an apparatus for neural networks. The apparatus generally includes a processing system configured to receive a first input event at a first node in a neural network, to advance a state of the first node based on the received first input event, and to determine when, if ever, a first output event for the first node is expected to occur based on the advanced state of the first node.

Certain aspects of the present disclosure provide an apparatus for neural networks. The apparatus generally includes means for receiving a first input event at a first node in a neural network, means for advancing a state of the first node based on the received first input event, and means for determining when, if ever, a first output event for the first node is expected to occur based on the advanced state of the first node.

Certain aspects of the present disclosure provide a computer-program product for neural networks. The computer-program product generally includes a computer-readable medium having instructions executable to receive a first input event at a first node in a neural network, to advance a state of the first node based on the received first input event, and to determine when, if ever, a first output event for the first node is expected to occur based on the advanced state of the first node.

Certain aspects of the present disclosure provide a method for neural networks. The method generally includes generating a vector referencing a list of events for a plurality of nodes in a neural network, wherein the list is ordered temporally from an earliest event to a latest event; and finding in the list one or more events nearest a target using the vector, without traversing the list.

Certain aspects of the present disclosure provide an apparatus for neural networks. The apparatus generally includes a processing system configured to generate a vector referencing a list of events for a plurality of nodes in a neural network, wherein the list is ordered temporally from an earliest event to a latest event; and to find in the list one or more events nearest a target using the vector, without traversing the list.

Certain aspects of the present disclosure provide an apparatus for neural networks. The apparatus generally includes means for generating a vector referencing a list of events for a plurality of nodes in a neural network, wherein the list is ordered temporally from an earliest event to a latest event; and means for finding in the list one or more events nearest a target using the vector, without traversing the list.

Certain aspects of the present disclosure provide a computer-program product for neural networks. The computer-program product generally includes a computer-readable medium having instructions executable to generate a vector referencing a list of events for a plurality of nodes in a neural network, wherein the list is ordered temporally from an earliest event to a latest event; and to find in the list one or more events nearest a target using the vector, without traversing the list.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 19 illustrates an example scheduling vector referencing a linked list schedule, in accordance with certain aspects of the present disclosure.

FIG. 20 illustrates the scheduling vector of FIG. 19 after one node's lead event changed, in accordance with certain aspects of the present disclosure.

FIG. 21 illustrates an example sparse scheduling vector, in accordance with certain aspects of the present disclosure.

FIG. 22 conceptually illustrates the synaptic delay between a pre-synaptic neuron and a post-synaptic neuron, in accordance with certain aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
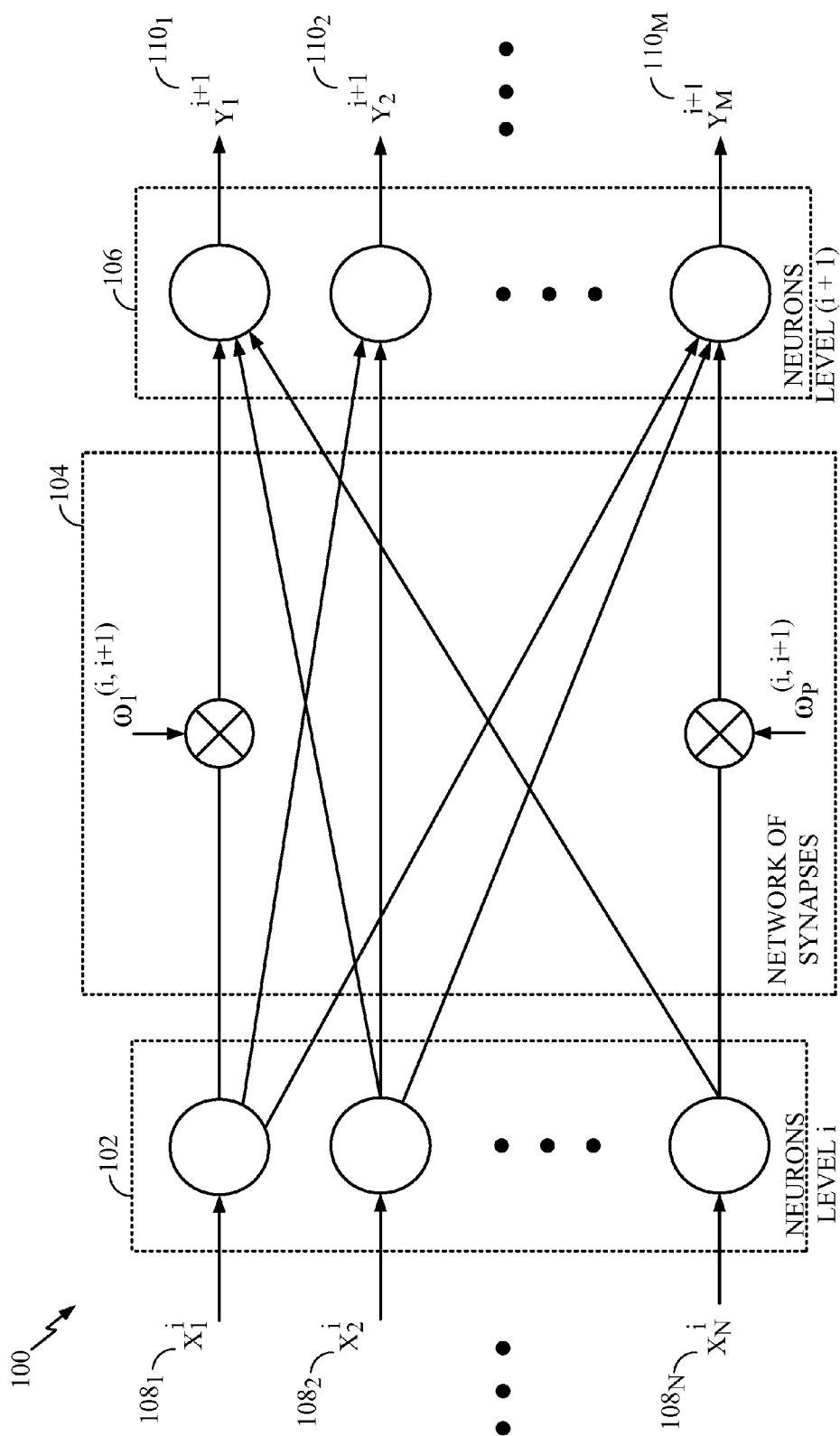
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated in software or in hardware (e.g., by an electrical circuit) and utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

Example Continuous-Time Spiking Neural Network Event-Based Simulation

Event-based simulations of neural networks have been problematic due to complexity. The main problem is executing events in order. When the number of neural network nodes (e.g., synapses and/or neurons) is high and the number of co-pending (scheduled) events is high, sorting of the schedule becomes a major computationally burdensome task. Also, traditional/conventional neuron/synapse models do not lend themselves well to event-based simulation and often involve iteration (which limits speed and stability) or table lookup (which limits precision and accuracy) to compute a stable solution. As a result, event-based formulations are often orders of magnitude slower than step-based simulations. Certain aspects of the present disclosure provide a formulation of a continuous-time neural network event simulation (model) that overcomes both the aforementioned problems: (1) a multi-dimensional multi-schedule architecture with ordered and unordered schedules and accelerators overcomes the sorting problem; and (2) a formulation of modeling event operations as anticipating (the future) and advancing (jump ahead/catch up) rules or methods overcomes the continuous time modeling problem. The advantages include faster simulation of spiking neural networks (order(s) of magnitude faster) and a method for describing and modeling continuous time neurons, synapses, and general neural network behaviors.

Conventional simulations of neural networks operate in time steps, advancing by a fixed amount of time per step. State updates (i.e., updates to the state of a neural network node) are typically done in a batch before propagating outputs to the next step. Neuron models described by differential equations are evaluated by numerical methods such as the Euler method. The problem with this is that such models are often unstable due to sensitivity to parameters including the exact time step. Moreover, results are only available at the time resolution of the simulator (i.e., the time step). This means the amount of information that can be conveyed is limited. For example, if the time of a spike is limited to a resolution of 1 ms, then the maximum communication rate is 1 kbps. This also makes it impossible to determine if one spike caused another when the two spikes occurred during the same time step. With some neuron models it is even impossible to distinguish different inputs given a fixed time resolution. In other words, the output is the same regardless of the different timing of inputs. Moreover, models may often be iterated at a smaller time step to limit (not necessarily to avoid) instability. As a result, the simulation generally runs many times slower.

Event-based simulations have been proposed. However, several problems have prevented these from gaining traction, namely modeling difficulties and/or speed/complexity issues.

First, neuron models with rich behavior often have differential equations that cannot be directly solved in closed form. Such model behaviors may be described by iterative operations in event-based simulations. This not only defeats the purpose, but also results in slow execution. Generally, the manner in which models are described places a limitation on the simulation. Neuron models are typically described by a rule to be executed at a given time step. If an event-based simulation merely executes time step updates in a different order, there is no advantage. Accordingly, what is needed is a different way of considering and describing neuron behavior.

Figure 2:
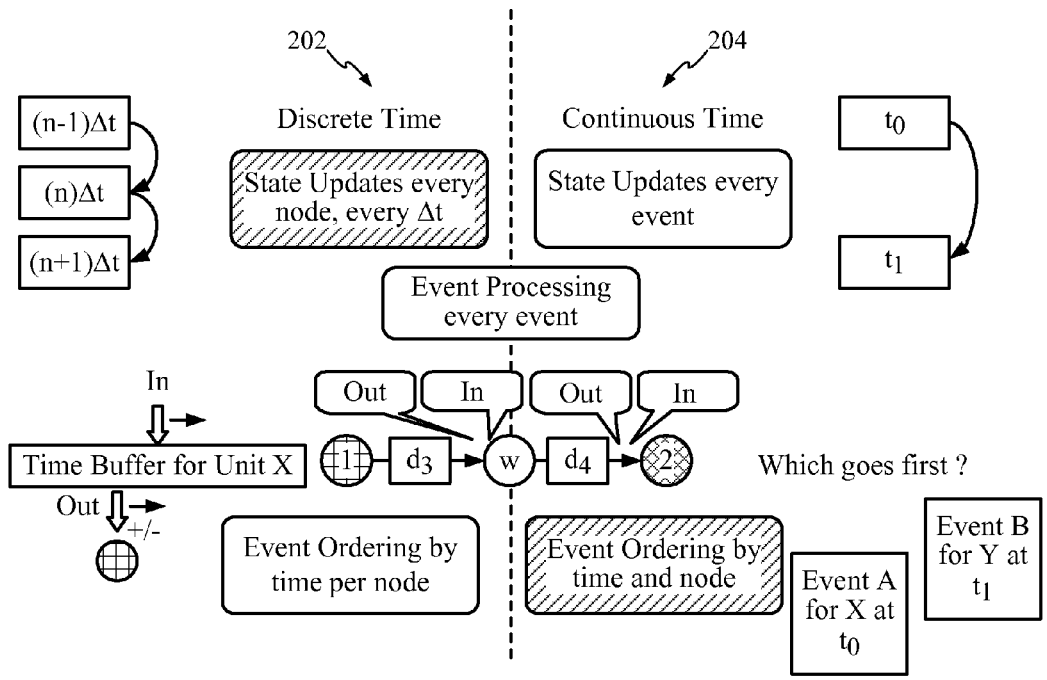
FIG. 2 illustrates a comparison between discrete time and continuous time neural network simulations with respect to state updates, event processing, and event ordering, in accordance with certain aspects of the present disclosure.

Second, ordering of events is often a major bottleneck. The ordering or sorting of events becomes intractable when the number of co-pending events is large. Three elements determine the speed of a neural network simulation: state updates, event processing, and event ordering. These elements are depicted in a comparison between conventional discrete time simulations 202 and continuous time simulations 204 in FIG. 2.

With a conventional discrete time or stepped simulation, the state updates are the bottleneck (shaded block in the upper left). With an event-based simulation, event ordering is often the bottleneck (shaded block in the lower right) in non-trivial (i.e., not small) networks.

Figure 3:
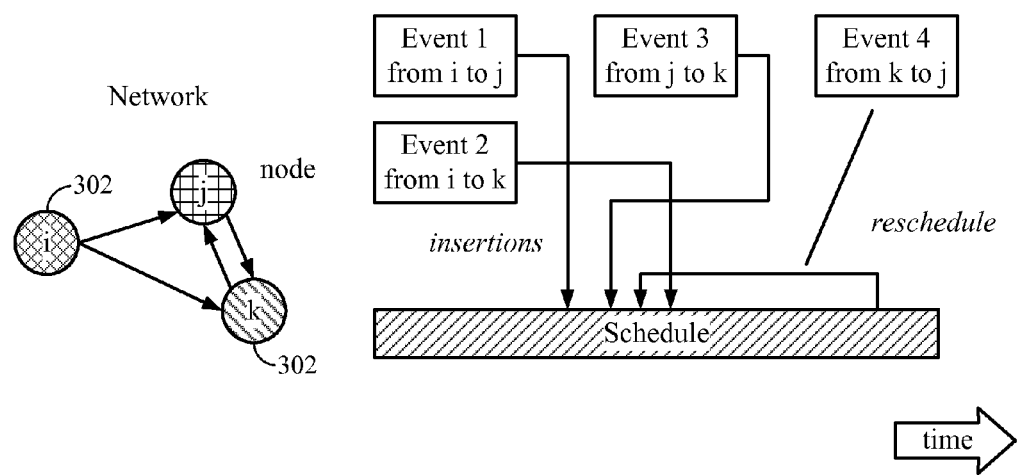
FIG. 3 illustrates example scheduling of events for three neural network nodes, in accordance with certain aspects of the present disclosure.

Typical (prior) event-based simulations are slow because of the complexity of sorting events. Inserting, deleting, and rescheduling events in the schedule becomes a problem that grows exponentially with events. An example of the problem is illustrated by the nodes 302 of FIG. 3. For example, the connection from node i to node k is longer than the connection from node i to node j and thus takes more time for events from node i to reach node k than node j. As a result, upon an output event from node i, the following may be scheduled: an input event 1 for node j and an input event 2 for node k, which occurs later. As a result of receiving the input event 1, assume that node j then produces an output event which will result in an input event 3 for node k. This input event 3 may even occur before the input event 2 for node k if the delay from node j to node k is small. Furthermore, an output event 4 for node k (to node j) may have to be rescheduled because the additional input due to input event 3 may have reduced the amount of time that it will take for node k to spike (i.e., generate an output event).

These scheduling operation examples highlight the fact that a typical event-based simulation entails burdensome schedule sorting/ordering operations. This burden increases dramatically (exponentially) as the number of nodes and connections increases because this will increase the number of events.

Typical enhancement attempts include keeping only the front of the schedule sorted. However, if delays between nodes in the network vary, events will be mixing across a broad time window, and the benefit of this enhancement is limited. Another approach is to relax the ordering constraint to within some time margin. However, this alters network behavior. In summary, even with proposed enhancements, typical event-based simulations offer limited hope for improvements.

Accordingly, what is needed is techniques and apparatus for modeling neural networks without the state update and event ordering bottlenecks, especially for large networks.

Certain aspects of the present disclosure include scheduling methods, scheduling acceleration methods, and modeling methods. Although these methods are inter-related, they may also be used individually. The scheduling (acceleration) and modeling methods work with events. This does not mean that all inputs and outputs in aspects of the present disclosure occur at discrete moments. For example, an inhibitory post-synaptic potential (IPSP) may have an increasing and then decreasing shape over time. However, each behavior, including an IPSP for example, has an associated event which has a particular time, such as the time when the IPSP starts or peaks.

Co-Pending Events

A central element to aspects of the present disclosure is events. Each node, such as a synapse or neuron, may have input and output events. In the present disclosure, input and output events are described as pending or scheduled and will generally be considered together. However, it should be understood that input and output events may be dealt with separately, as well (such as in separate schedules for certain aspects). Additionally, input and output events may be treated differently, as described below. Synapses and neurons are both examples of nodes that may have input and output events. An input event for a neuron is a result of an output event from a synapse and vice versa.

Figure 4:
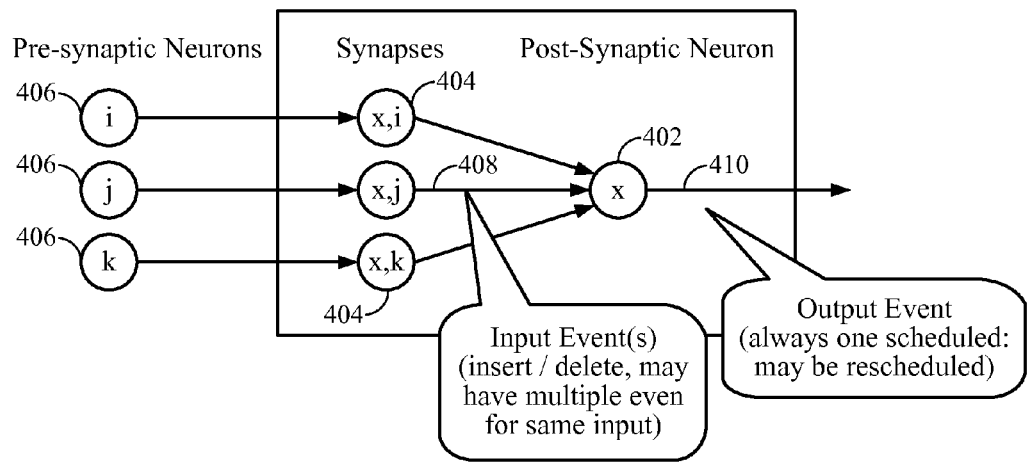
FIG. 4 illustrates example input event(s) and an output event for a post-synaptic neuron, in accordance with certain aspects of the present disclosure.

For example, FIG. 4 illustrates a post-synaptic neuron 402 (neuron x) connected with three separate pre-synaptic neurons 406 (neurons i, j, and k) via three synapses 404, one synapse 404 for each pre-synaptic/post-synaptic neuron connection. From the perspective of the post-synaptic neuron 402, the post-synaptic neuron 402 may receive one or more input events 408 from the synapses 404. The input events 408 may cause the post-synaptic neuron 402 to schedule, reschedule, and/or eventually output an output event 410. Before the post-synaptic neuron 402 generates the output event 410, the input events 408 may be inserted and/or deleted from the schedule, and multiple input events may be received via the same synapse 404.

In particular, the present disclosure is concerned with "co-pending events." As used herein, an event is co-pending with another event if scheduling operations must deal with determining the order of the two events. Not all events are co-pending events. Only events that have been scheduled can be co-pending.

For example, consider the case where two input events to a particular neuron are scheduled to occur in the future. Those two events are co-pending. If the receiving neuron has not spiked yet, but has been scheduled to spike at a particular time in the future, then that output spike event is also co-pending with the inputs. However, if the neuron has not yet spiked, then the input events that would occur once the neuron spikes are not yet scheduled and are thus not co-pending.

The order of events that have the same time is determined by certain aspects of the present disclosure. For certain aspects, the order is determined by the event schedule insertion mechanism such that the least searching is done. However, same-time events may be ordered by node identifier, order of determination, or based on impact to the scheduling, for example.

Example Models for the Event-Based Simulation

The Anticipate-Advance Cycle

Figure 5:
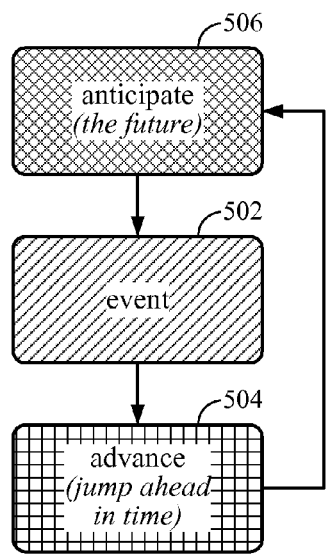
FIG. 5 illustrates the anticipate-advance cycle for a single node, in accordance with certain aspects of the present disclosure.

Output events are anticipated. When output events occur, they generate input events. Input events may then incur state advances (as used herein, the term "advance" generally refers to updating, but is used instead of "update" to distinguish from step-based updates in discrete time systems). State advances may change when an output event is anticipated to occur. This loop (dubbed the "anticipate-advance cycle") is illustrated in FIG. 5 for a single node and applies to all nodes (whether synapse or neuron). At 502, an event occurs (e.g., an input event is received at a particular node from another node), which causes the node to advance the state of the node at 504. Because the state of the node has advanced at 504, the expected time for the node's output event may change, so the node anticipates this expected time at 506. Then, either the node outputs the output event according to the expected time at 502 or a new input event is received at 502 before the expected time, and the anticipate-advance cycle repeats.

As stated above, this loop applies to each node. So in a neural network with connected nodes, an output from a neuron (or synapse) generates an input to a synapse (or neuron), and thus the loops for each node are linked.

Figure 6:
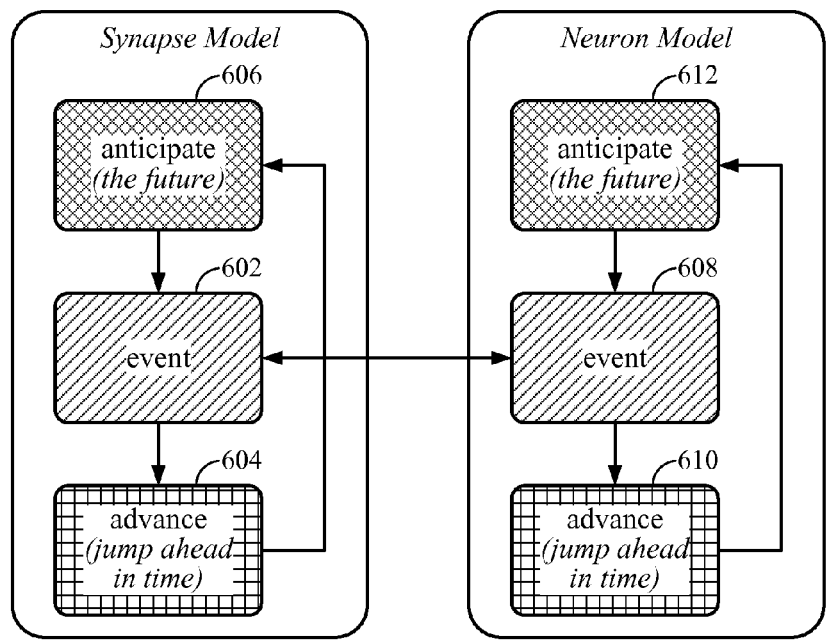
FIG. 6 illustrates an example relationship between the anticipate-advance cycles for a synapse and for a neuron, in accordance with certain aspects of the present disclosure.

FIG. 6 illustrates an example of this linked relationship between the anticipate-advance cycles for a synapse and for a neuron (a post-synaptic neuron). At 602, an event occurs (e.g., an input event is received at the synapse from a pre-synaptic neuron (not shown) or an output event occurs and is output from the synapse), which causes the synapse to advance its own state at 604. Because the synapse's state has advanced at 604, the expected time for the synapse's output event may change, so the synapse anticipates this expected time at 606. Then, either the synapse outputs the output event according to the expected time at 602 or a new input event is received at 602 before the expected time, and the synapse's anticipate-advance cycle repeats.

Furthermore, once the synapse output event occurs, the output event is received by the post-synaptic neuron as an input event at 608, which causes the neuron to advance its own state at 610. Because the neuron's state has advanced at 610, the expected time for the neuron's output event may change, so the neuron anticipates this expected time at 612. Then, either the neuron outputs the output event according to the expected time at 608 or a new input event is received at 608 before the expected time, and the neuron's anticipate-advance cycle repeats.

As another example, consider the following sequence:
1. An output from pre-synaptic neuron A is an input to synapse X, arriving after time dt1.
2. The synapse state jumps ahead (is advanced) by an amount of time dt1 (may be no operation or depend on how much time has passed and the last state). The synapse state is also adjusted to reflect the input (may be no operation or a learning operation or may change one or more state variables of the synapse).
3. The synapse anticipates passing on the input to the post-synaptic neuron B after time dt2.
4. The synaptic output event occurs after time dt2.
5. The output event generates an input event to the post-synaptic neuron B.
6. The post-synaptic neuron B's state jumps ahead (advanced) by an amount of time dt1+dt2. The neuron B's state is adjusted to reflect the input.
7. The post-synaptic neuron B anticipates firing after delay dt3.
8. The post-synaptic neuron B fires after delay dt3.
9. The output event generates an input event for a synapse Y.
10. The post-synaptic neuron B's state jumps ahead by an amount dt3.
11. And so on . . . .

Certain aspects of the present disclosure allow a model designer (e.g., a designer of a neuron or synapse model) to determine (and/or describe) how to anticipate a future event (whether or not it will occur and when or in how much time). The model designer may also determine (and/or describe) how to advance (jump ahead or catch up) by a given amount of time. These are the main elements that describe the behavior of a node (e.g., a neuron or synapse) in the context of the present disclosure.

Figure 7:
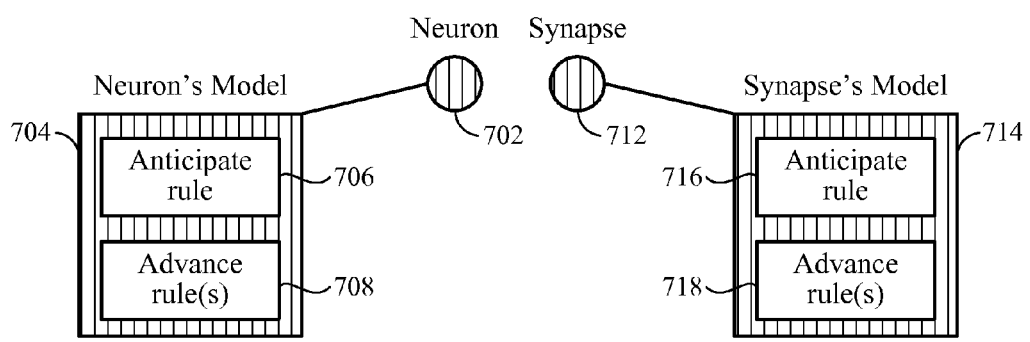
FIG. 7 illustrates anticipate and advance rules associated with each node, allowing a designer to describe the behavior of each node, in accordance with certain aspects of the present disclosure.

For example, FIG. 7 illustrates anticipate and advance rules associated with each node, allowing a designer to describe the behavior of each node, in accordance with certain aspects of the present disclosure. In FIG. 7, a designer may describe the behavior of a neuron 702 using a neuron model 704 having an anticipate rule 706 and one or more advance rules 708. The anticipate rule 706 (and/or advance rules 708) for this neuron model 704 may be the same as or different from the anticipate rule (and/or advance rules) for another neuron model, in the same neural network or otherwise. The designer may also describe a synapse 712 using a synapse model 714 having an anticipate rule 716 and one or more advance rules 718. Similarly, the anticipate rule 716 (and/or advance rules 718) for this synapse model 714 may be the same as or different from the anticipate rule (and/or advance rules) for another synapse model, in the same or a different neural network.

Certain aspects of the present disclosure abstract these operations for purposes of overall modeling/simulation. For example, a designer might want a variety of neurons that behave differently. Those differences may be described by the node models, but implemented by the simulation. This abstraction will be explained in further detail below.

Anticipating Events in the Future

According to certain aspects of the present disclosure, events are anticipated. Anticipation of an event constitutes determining when in the future an event is expected to occur. This does not require that the event actually occur. Moreover, the time at which an event is anticipated to occur may change at any time up until the event actually occurs (i.e., the event time is reached in the simulation). For certain aspects, only output events are anticipated. But input events and output events should not be confused. Output of one node is the input to another node. Input events are a result of output events. Input events are also scheduled to occur in the future, but are generally not changed (rescheduled for a different time) once scheduled.

How do we Anticipate a Synaptic Output Event?

A synapse is a point of connection between input and output neurons, or pre-synaptic and post-synaptic neurons, respectively. Typically, the connection has delay. The delay may be due to the time involved for a signal to propagate down the pre-synaptic neuron's axon, to activate the synapse, or to propagate down the post-synaptic neuron's dendrite to the soma. The particular abstraction is not important. Over the short term, these delays may be relatively constant (fixed or predetermined). Thus, anticipating a synaptic event becomes a matter of two cases: if there is no input event (pre-synaptic spike), there is no anticipated synaptic event to relay; or if there is an input event (pre-synaptic spike), then a synaptic output event is anticipated to occur in the future with the coinciding predetermined delay. These determinations are made by the node model.

Notice that in this framework, it becomes a simple matter to model variable delay. Delays in biological networks may change due to dynamics or structural changes, such as the formation or motion of dendritic structures such as spines or branches or the physical changes in shape or surface area of such structures. These effects may be modeled by changing the delay.

For example, a first input may be scheduled with a first delay. Then the delay may be changed due to a structural plasticity algorithm. A second input may then be scheduled with a second delay. Both input events may be co-pending at the same time for the same or different post-synaptic neurons.

How do we Anticipate a Neuron Output Event?

Neuron models are typically described by dynamics relating to state variables. For certain aspects, neuron output times are deterministic and computable as a function of their state variables. Stated differently, the time remaining until a neuron spikes can be computed from state variable values at a time prior to the spike. However, what is important to note is that a neuron might receive more input before it spikes. That input might be excitatory and thus decrease the remaining time. Or, that input might be inhibitory and thus increase the remaining time (possibly to infinity, meaning that the neuron is not anticipated to fire at all). Thus, the anticipated output event time of a neuron changes when the trajectory of the state variables is altered. Therefore, certain aspects of the present disclosure include (re-)anticipating the neuron output event every time an event is processed for the neuron. For other aspects, anticipating the neuron output event is only done after two or more events have been processed for the neuron, depending on conditions (e.g., time elapsed since the first event).

Advancing States (Jumping Ahead and Processing Events)

For certain aspects of the present disclosure, advances are determined when an input event is processed, when an output event is processed, or both. An advance typically constitutes two operations: (1) jumping ahead the state and (2) processing the event. Jumping ahead (or catching up, depending on one's perspective) constitutes advancing the state to the time of the event to be processed. Processing the event constitutes changing the state according to the event. For example, if the event is an input to a neuron, an input current may be applied to compute a new membrane potential (voltage). If the event is an output from a neuron, the state may be advanced (changed) to return to a rest state (e.g., a rest potential).

Notice that, in general, if two or more events have the same time, the state typically need only be advanced prior to processing the first event. Some models may not even involve state advancement before consideration of input (the order of these two operations may not be strictly required).

Output Event Algorithm

For certain aspects, each neuron has only one output event scheduled at a given time. For certain aspects, an output event is always scheduled (or at least always defined or tracked even if not inserted in a schedule). Furthermore, the time of the output event may change (e.g., may be advanced, which may then effectively constitute re-scheduling). This is in contrast to input events for which the time generally does not change once scheduled and for which there may be multiple input events pending for the same connection (from a particular node to another particular node).

As an example, an output event may be processed as follows (where the neuron emitting the output event is the pre-synaptic neuron):

1. For each synapse connected to the pre-synaptic neuron's output:
    a. Anticipate the synaptic output event:
        i. whether or not there will be an event and
        ii. when it will occur (i.e., in how much relative time).
    b. If there will be no synaptic output event
        i. advance the synaptic model (jump ahead and process the input, e.g., learning)
    c. Otherwise if there will be an event, but the relative time to occur is 0 or less
        i. advance the synapse model (jump ahead and process the input, e.g., learning);
        ii. advance the post-synaptic neuron model (jump ahead and process input from the synapse); and
        iii. anticipate the next post-synaptic neuron event.
            1. If there is an anticipated output event, reschedule the event.
            2. Otherwise, remove the event or reschedule it for infinite delay.
    d. Otherwise
        i. submit a new input event for the post-synaptic neuron to occur with the determined delay (from (a) above).
2. For each synapse connected to the pre-synaptic neuron as input:
    a. Advance the synaptic model (jump ahead and process the input, e.g., learning)
3. Advance the pre-synaptic neuron's state (jump ahead and process the event).
4. Anticipate the next pre-synaptic neuron event.
    a. If there is an anticipated output event, reschedule the event.
    b. Otherwise, remove the event or reschedule it for infinite delay.

Note that there is a distinction between a neuron and the neuron's model (also between a synapse and the synapse's model). A model is that for which the model designer (simulator user) defines the behavior (via anticipate and advance rules, for example). The neuron (or synapse) is the simulation entity, which has associated events. While the present disclosure may use these terms interchangeably (between a node and its model), it should be clear from the context whether the node or the node's model is meant.

Notice also that if a synapse has zero delay, the input event need not be scheduled. Instead, it may be processed immediately by the post-synaptic neuron. This is described further below in the section entitled "Model Operation (Anticipate & Advance) Execution Strategies" as it relates to zero synaptic delay.

Input Event Algorithm

An input event may be processed as follows (where the neuron receiving the synapse input is referred to as the post-synaptic neuron):

1. Advance the synapse (jump ahead and process the input, e.g., learning)
2. Advance the post-synaptic neuron model.
3. Anticipate the next post-synaptic neuron event.
    a. If there is an anticipated output event, reschedule the event.
    b. Otherwise, remove the event or reschedule it for infinite delay.

Note that in the simulation, synapse input events and synapse output events need not be scheduled. These events may be handled immediately (virtually). A synapse input event is generated by a neuron output event (they can be thought of as the same for purposes of the simulation). A synapse output event generates a neuron input event (again these can be thought of as the same for purposes of the simulation).

Example Complete Event Processing

Figure 8:
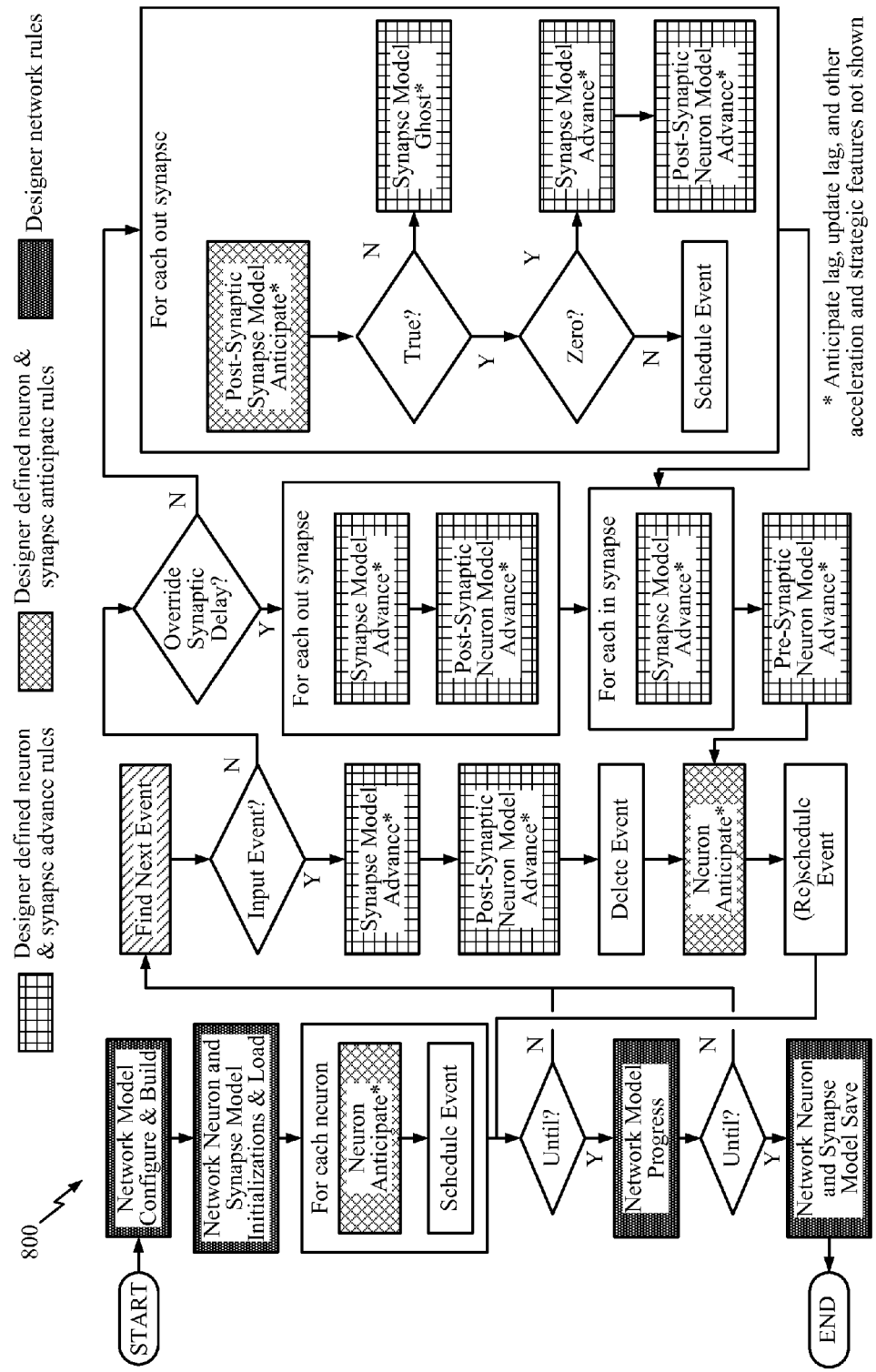
FIG. 8 is a flow diagram illustrating an example complete event processing for a neural network, in accordance with certain aspects of the present disclosure.

FIG. 8 shows the entire event processing comprising invocation of model rules for advances (grid shading with horizontal and vertical lines), rules for anticipate (cross-hatching with diagonal lines), and rules for a network (honeycomb shading) as a whole.

Units

Figure 9:
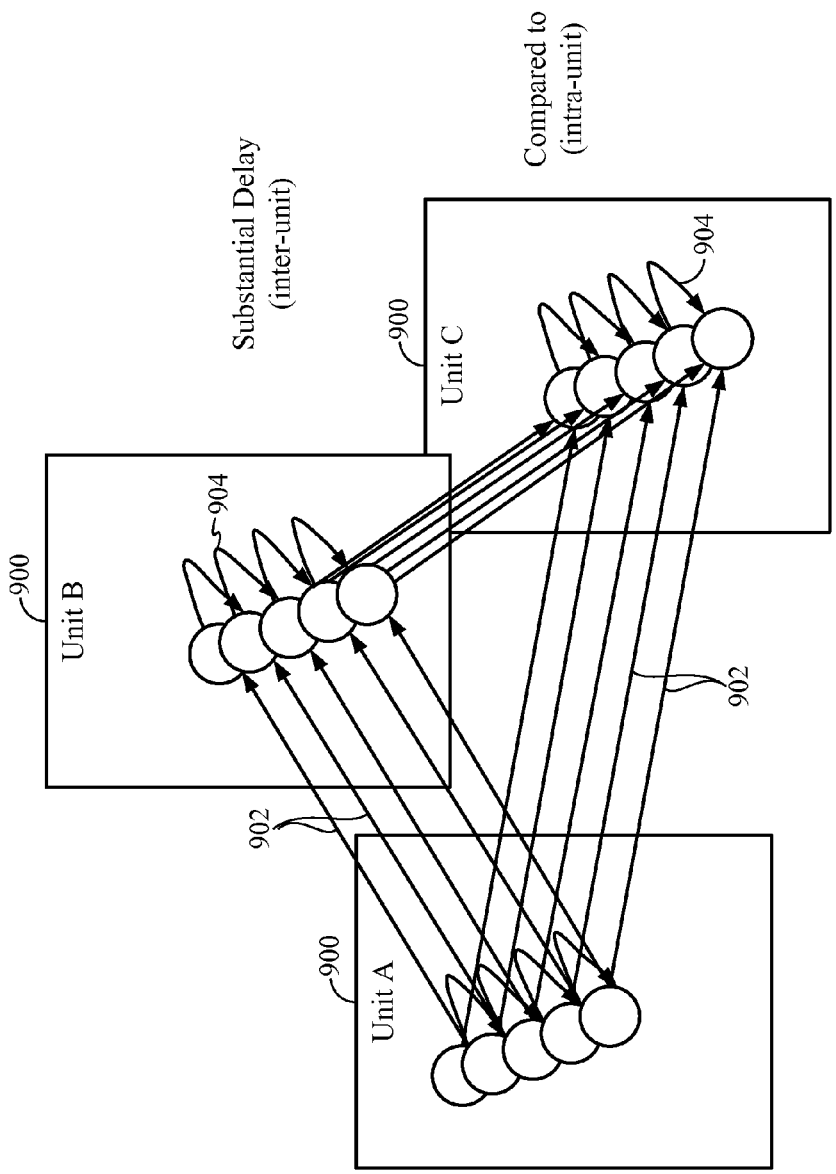
FIG. 9 illustrates nodes organized into units, such that the inter-unit delay is substantial compared to the intra-unit delay, in accordance with certain aspects of the present disclosure.

According to certain aspects, nodes (e.g., neurons) may be organized into units. For certain aspects, the units may be organized depending on connection delays. For example, as shown in FIG. 9, the nodes may be grouped into units 900 such that delays for connections between units (inter-unit delays 902) are longer than delays within units (intra-unit delays 904), although the opposite may also be considered.

In general, unit size may most likely be kept relatively small. The reason for this will become apparent from scheduling operations. For certain aspects, the unit size may be limited to a maximum, and a neural network model may be automatically divided up into units to not exceed this maximum.

For certain aspects, the network model designer may also have the option to specify which neurons belong to a unit and/or when to allocate neurons to a different (new) unit. Since a model designer may know a priori information about the distribution of events (due to connectivity, activity, and delays), this allows for strategic assignment or allocation of neurons to units for purposes of execution speed in software or hardware.

Scheduling

Figure 10:
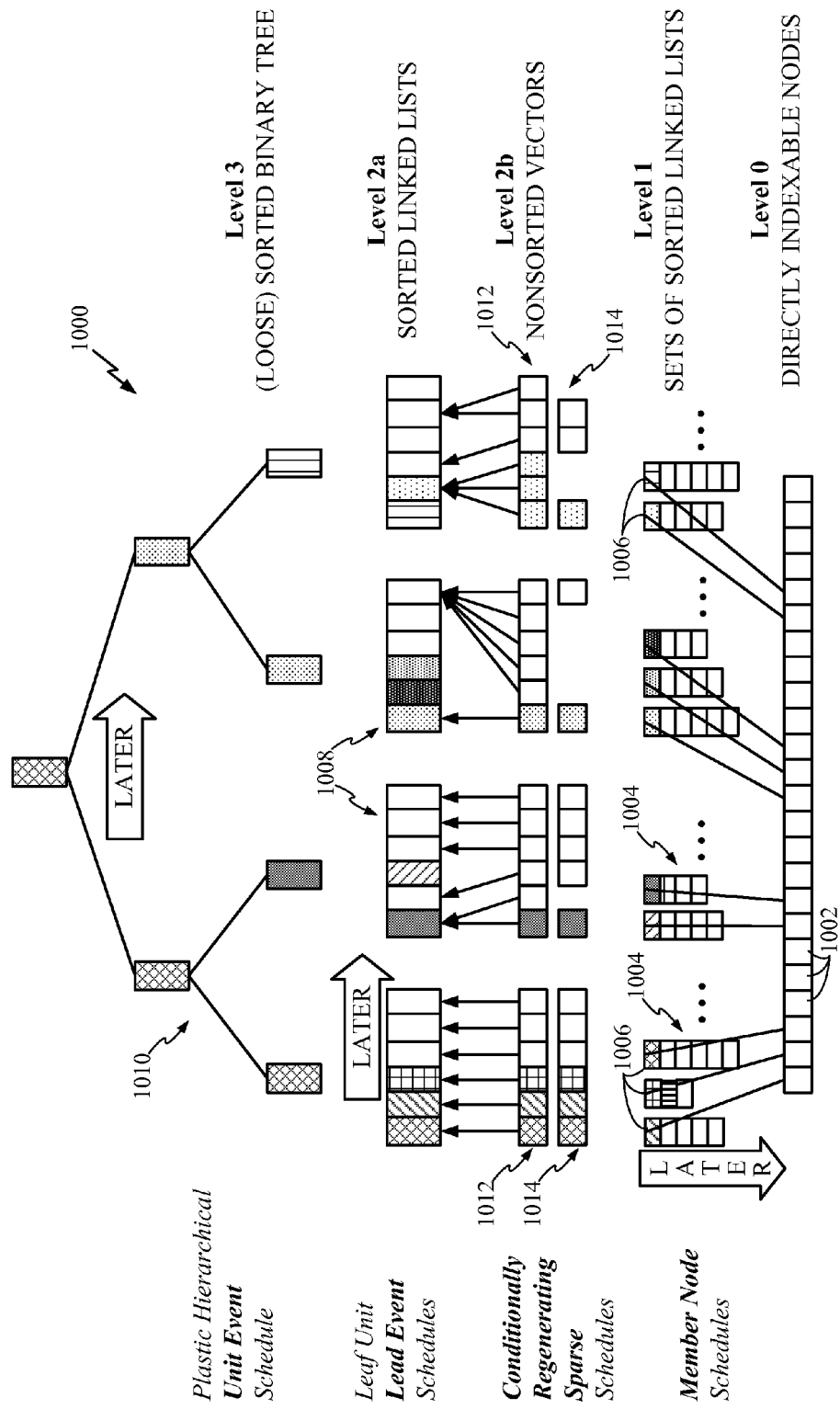
FIG. 10 illustrates various event-scheduling methods used at different levels of a multilevel scheme, in accordance with certain aspects of the present disclosure.

Certain aspects of the present disclosure include executing anticipate and advance operations upon events. To determine the order in which to deal with events, certain aspects use several scheduling methods at different levels. FIG. 10 illustrates various event-scheduling methods used at different levels of a multilevel scheme 1000, in accordance with certain aspects of the present disclosure. An implementation need not use all of these methods, but certain aspects may include all of these.

Level 0

At the lowest level (Level 0) of the multilevel scheme 1000, node classes may be maintained. These nodes 1002 may be indexed and accessed directly (i.e., directly indexable nodes). Each node 1002 may represent a neuron or a synapse in the neural network.

Acceleration at the lowest level may be achieved by modeling and model operation (anticipate and advance) execution strategies which are described separately below.

Level 1

At the next level (Level 1), each node class has a schedule containing all co-pending input and output events for the node 1002 (only for that node). The member node schedule for each node 1002 is a list 1004 (e.g., a linked list) that may be maintained in sorted order or may be maintained in partially sorted order (e.g., with at least the earliest event 1006 in time being listed first). For certain aspects, there may be only one output event (at most). The earliest event 1006 is called the "lead" event.

Acceleration for searching for insertion points or deletion of events (entries in the list 1004) at this level may be achieved by parallel searching from front of the list 1004, back of the list 1004, and last insertion point (or whichever is closest in time or is converging toward the desired time point fastest or closest).

Level 2

At the next level (Level 2), each unit 900 of neurons may have a schedule 1008 of lead events (at Level 2a). This schedule 1008 includes only lead events from the Level 1 (i.e., the earliest event for each neuron in the unit 900), and these lead event schedules may be implemented with sorted linked lists, for certain aspects. If the number of neurons per unit is fixed, the number of entries in the schedule 1008 is fixed. Notice that at a minimum, a neuron has an output event scheduled to occur at an infinite time in the future (i.e., never).

Acceleration for searching for insertion points or deletion of events (entries in the schedule 1008) at this level may be achieved by parallel searching from front of the schedule 1008, back of the schedule 1008, and last insertion point (or whichever is closest in time or is converging toward the desired time point fastest or closest).

However, greater acceleration at this level may be achieved using one or more referencing vectors (e.g., actual vector 1012 and virtual vector 1014). Each unit 900 may also have a counterpart non-sorted vector (at Level 2b). Each vector may contain references to the counterpart schedule 1008. The vector entries may be used to rapidly search the schedule 1008 by time. According to certain aspects, the vector entries may be rebuilt on-the-fly depending on conditions. This Level 2 acceleration method is called "Conditionally Regenerating Sparse Scheduling" and is described separately below.

Level 3

At the next level (Level 3), units 900 may be organized according to the head lead event at the unit level. This is the earliest lead event in each unit 900. One example is to use a binary tree 1010 as illustrated in FIG. 10.

Operation at this level may be accelerated, as well. The organization need not be fully sorted (or even partially sorted), as long as the earliest head lead event can be found directly. Another acceleration method involves determining the unit size. By decreasing unit size, operation complexity at lower levels may be reduced at the cost of organizing units. As the number of nodes is increased, unit size may be increased to counter the tradeoff of maintaining operations at Level 3.

Schedule Operations

Finding a Node

Figure 11:
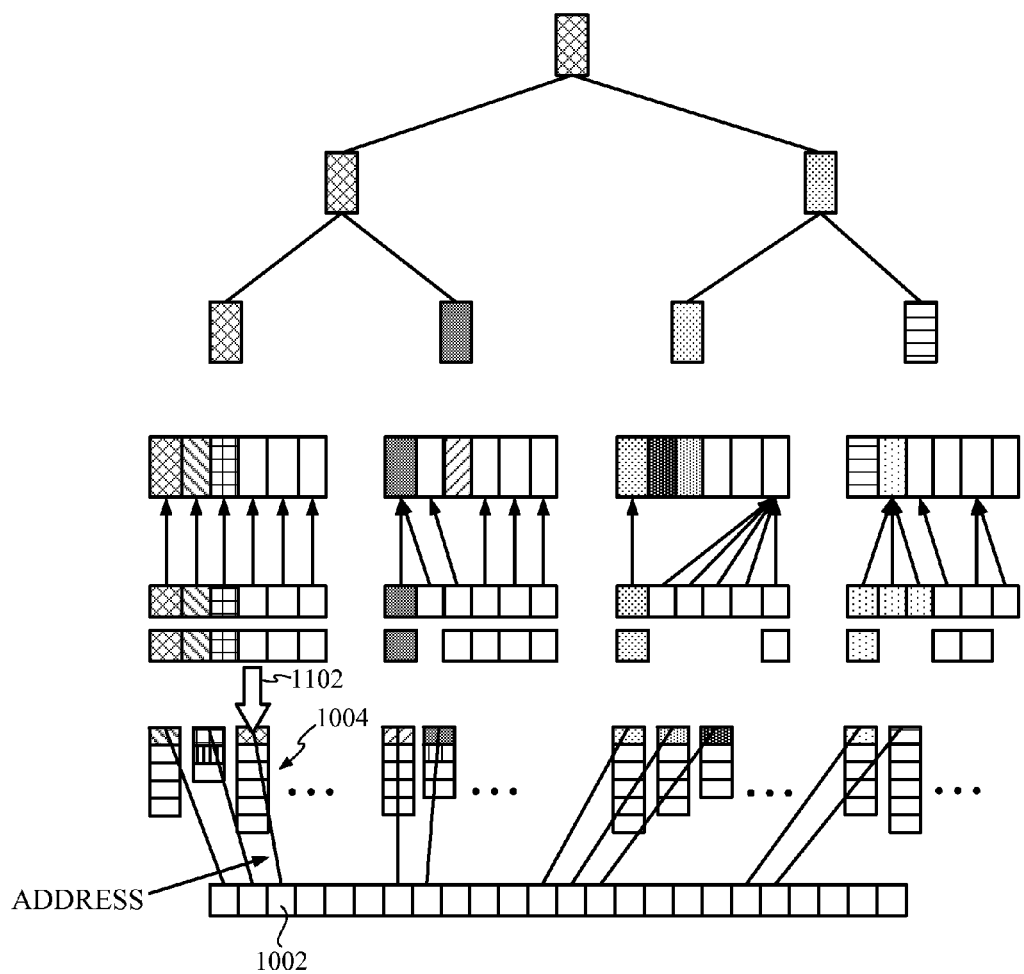
FIG. 11 illustrates finding an example node using the multilevel scheme of FIG. 10, in accordance with certain aspects of the present disclosure.

A node's schedule (e.g., list 1004) may be found by addressing the node 1002 at the lowest level (Level 0). FIG. 11 illustrates finding an example list 1004 for a node 1002 by addressing the node 1002 directly at 1102 using the multilevel scheme 1000 of FIG. 10.

Finding the Earliest Event

Figure 12:
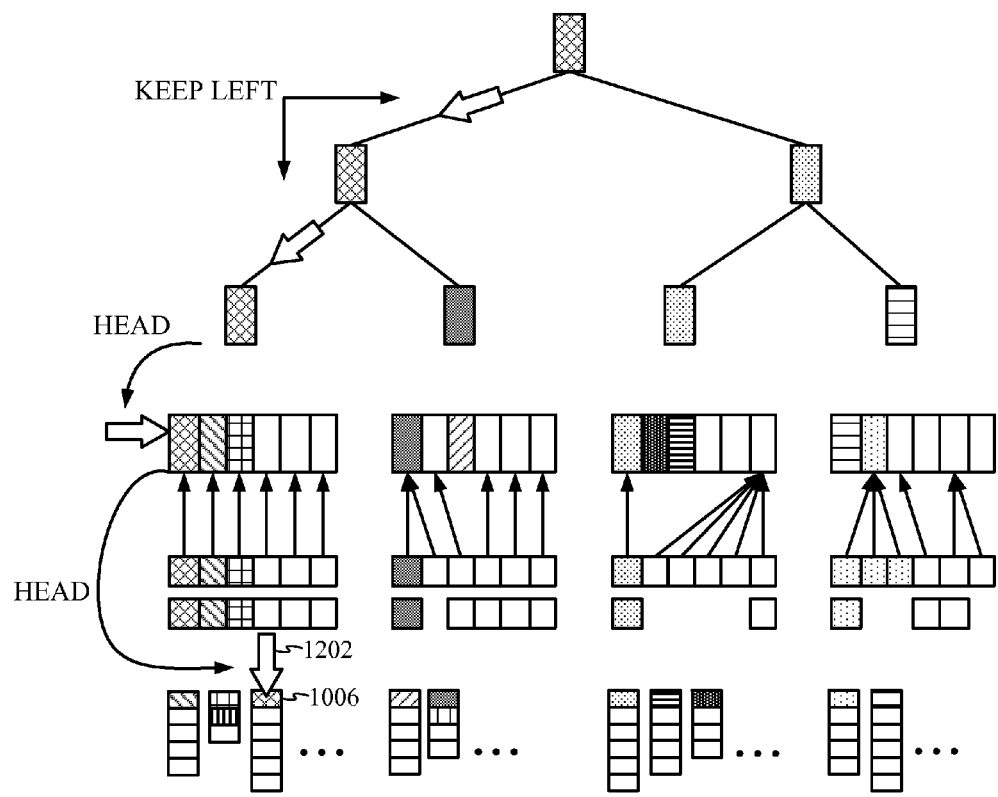
FIG. 12 illustrates finding the earliest event using the multilevel scheme of FIG. 10, in accordance with certain aspects of the present disclosure.

The earliest event (i.e., the next event) may be found by traversing the levels of the multilevel scheme 1000 from the top down, as exhibited in FIG. 12. From the root of the binary tree 1010 at Level 3, the next event may be found at 1202 by keeping to the left when traversing the binary tree 1010, determining the head lead event in the lead event schedule 1008 for a single unit 900, and determining the earliest event 1006 in the list 1004 for the node 1002 associated with the head lead event. Finding the next event involves very little computation because the earliest event at each level is already determined. Note that determining what the next event is may be found immediately from examining the root of the binary tree 1010.

Deleting a Processed Event

Figure 13:
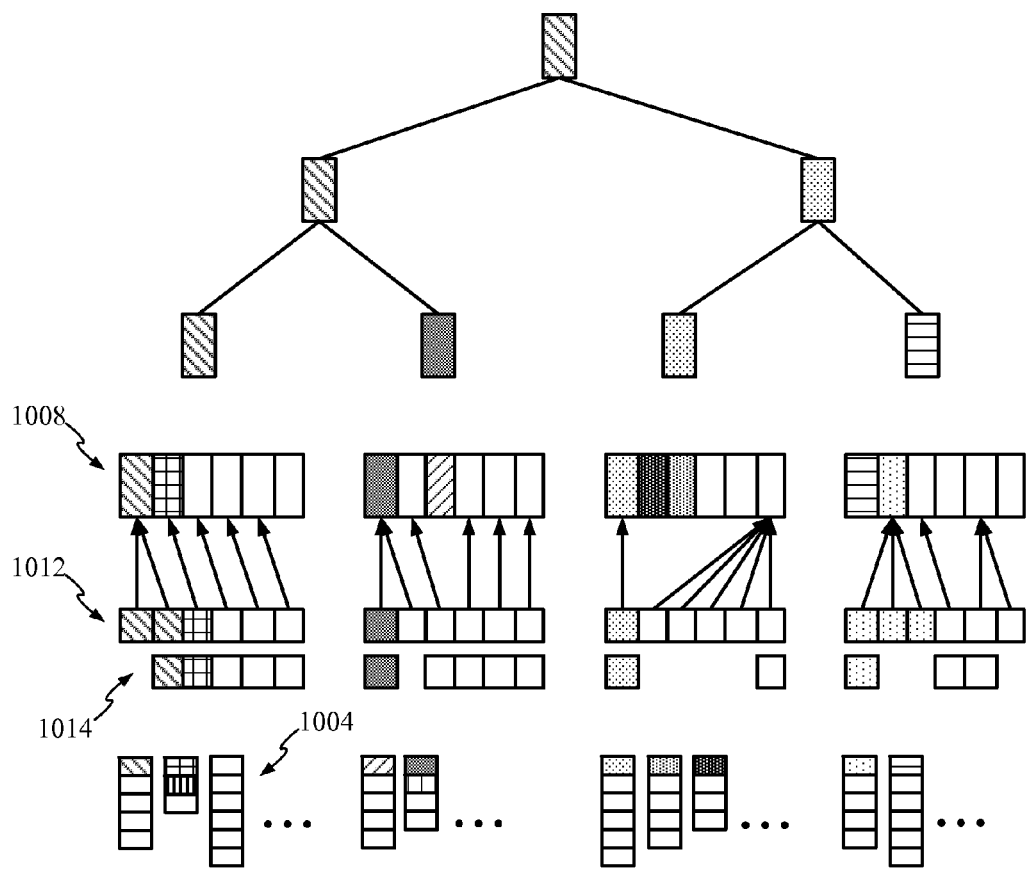
FIG. 13 illustrates deleting an example processed event using the multilevel scheme of FIG. 10, in accordance with certain aspects of the present disclosure.

Once an event has been processed, the event may be deleted by removal from the node's schedule at the lowest level (Level 0). In FIG. 13, the cross-hatched event that was previously the next event at 1202 in FIG. 12 has been removed. As a result, the lead event in the node schedule changes (i.e., the cross-hatched event at 1202 has been removed from the list 1004 such that there is a new lead event (not shaded in FIG. 13)). In this example, a lead event for a different node 1002 (i.e., the negatively sloped diagonal line shaded event) is the next earliest event at the unit level (at Level 2a) and even at the entire network level (Level 3) and thus becomes the next event. This update is propagated through the various levels of the multilevel scheme 1000 after the processed event has been deleted, resulting in the depiction shown in FIG. 13.

Inserting or Deleting a Non-Lead Event

Figure 14:
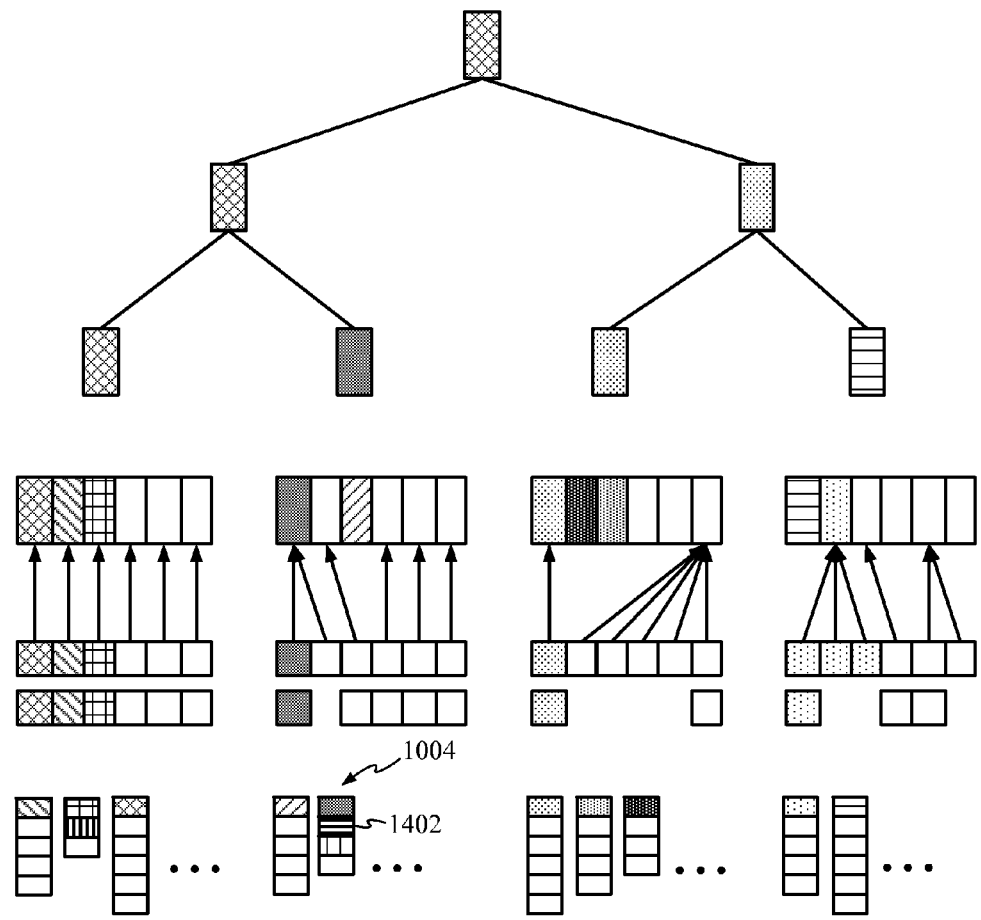
FIG. 14 illustrates inserting or deleting an example non-lead event using the multilevel scheme of FIG. 10, in accordance with certain aspects of the present disclosure.

However, sometimes an event is inserted or deleted (e.g., to be rescheduled) when it is not the next event. As a result, less change may be implicated as shown in FIG. 14. In FIG. 14, event 1402 is inserted into the list 1004 for a particular node 1002 in the second unit 900. Since the inserted event 1402 is not an earliest event 1006 (a lead event) for the node 1002, updates to any of the other levels in the multilevel scheme 1000 due to the inserted event 1402 need not occur at this time.

Deleting a Lead Event

Figure 15:
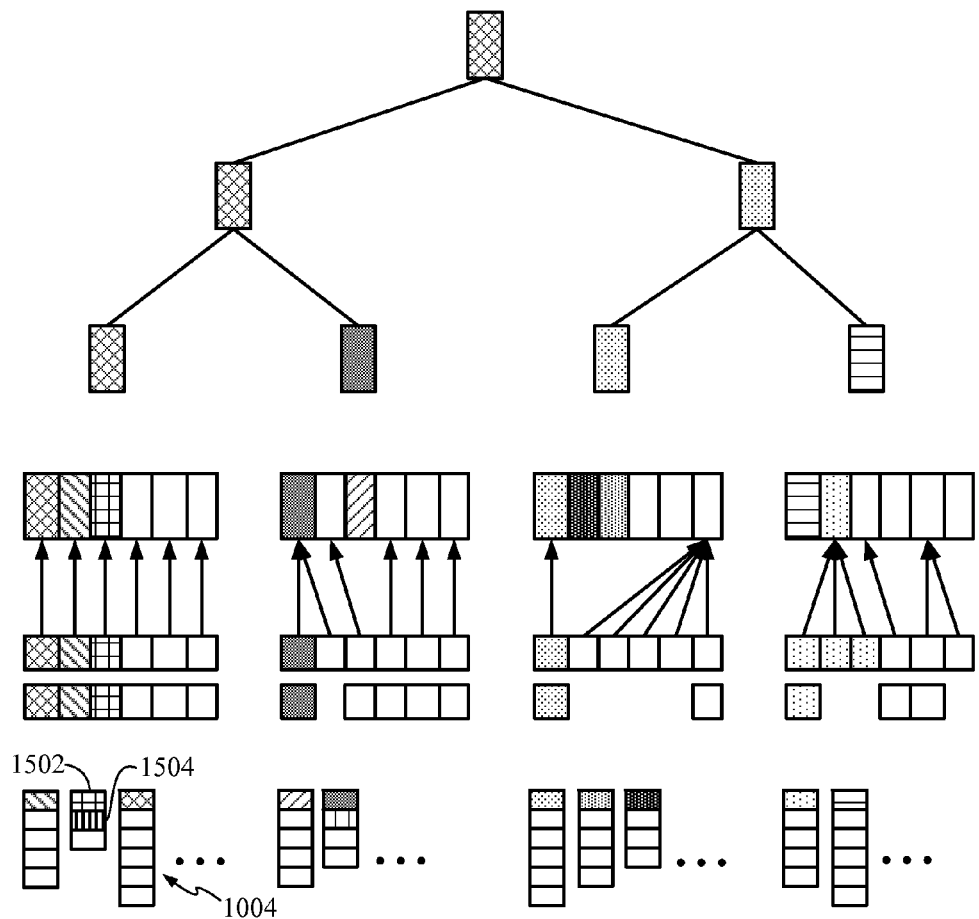
FIGS. 15-17 illustrate deleting an example lead event using the multilevel scheme of FIG. 10, in accordance with certain aspects of the present disclosure.

Deletion of a lead event is more complicated. Let us demonstrate starting with the situation in FIG. 15 and delete the lead event 1502 in the second node of the first unit 900.

First, the lead event 1502 is deleted from this particular node's schedule (the list 1004 for the node 1002). This would be the end of the operation if the deleted event had not been the lead event. Since the deleted event was the lead event, an update may most likely be performed at this and the next level (i.e., Levels 1 and 2).

Figure 16:
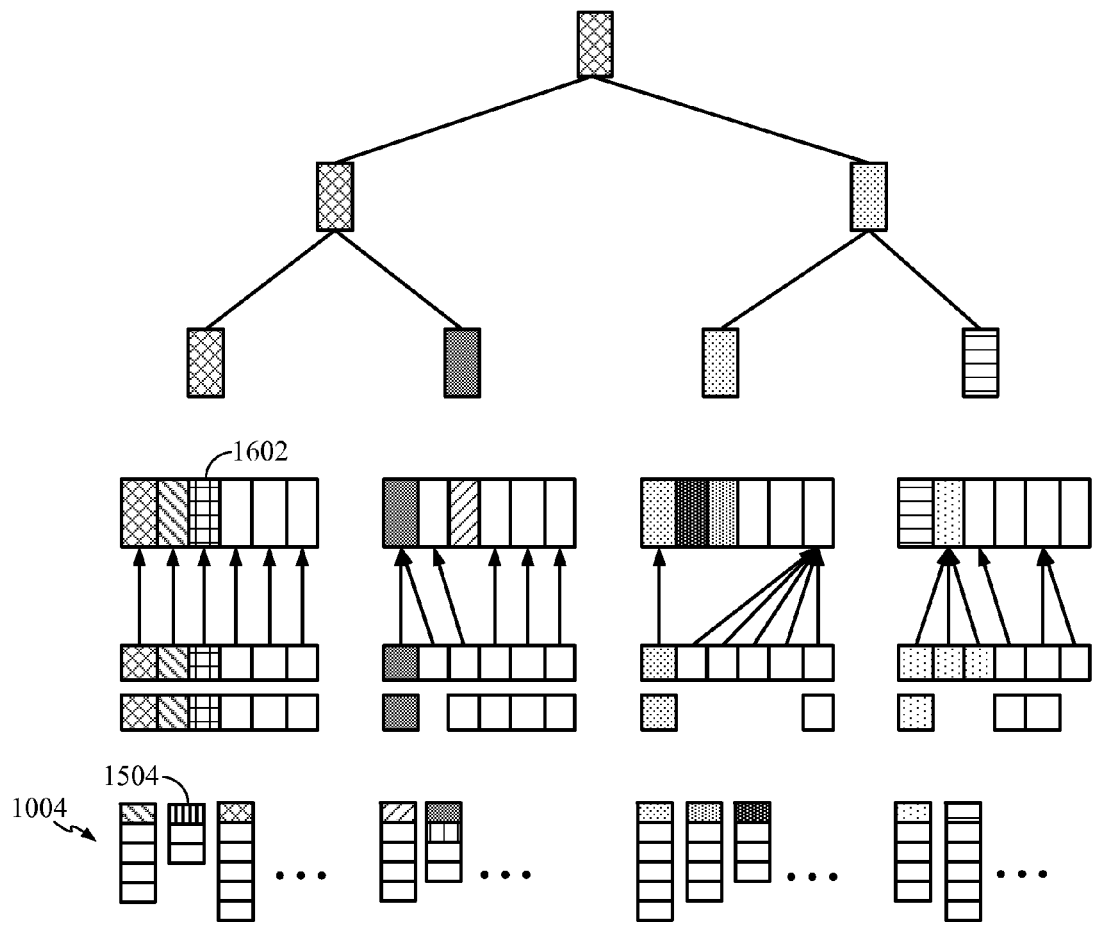
Figure 17:
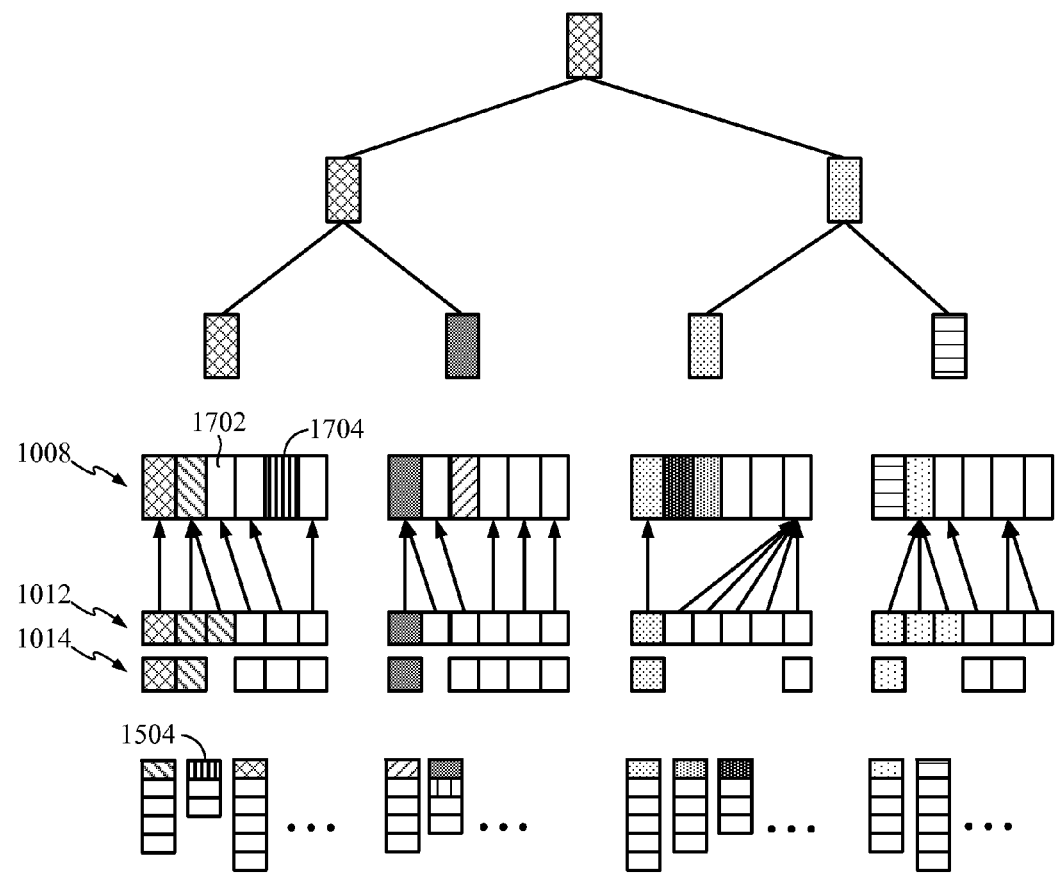

To update this level, the deleted lead event 1502 is replaced with the new lead event 1504, as shown in FIG. 16. Since that lead event 1504 is different, the schedule 1008 at the next level may also be sorted at this time, as illustrated in FIG. 17. Furthermore, since there was also a reference to the schedule entry 1702 from the vector 1012, the vector entry is nullified (the reference is removed, effectively shifting the references to the right relative to the schedule 1008). This may marginally deteriorate the effectiveness of finding entries in the schedule 1008 using the vector 1012 (at least until the vector is regenerated, as described below).

Since the lead event did not become the head lead event for the unit 900, the unit level organization (at Level 3) need not be updated for this operation.

Inserting a Head Lead Event

In the case in which the inserted event becomes the new head lead event for a unit 900, the unit level organization (at Level 3) may be updated. For example, FIG. 18 illustrates inserting an example head lead event using the multilevel scheme 1000 of FIG. 10, which causes a reorganization of the right part of the binary tree 1010.

Figure 18:
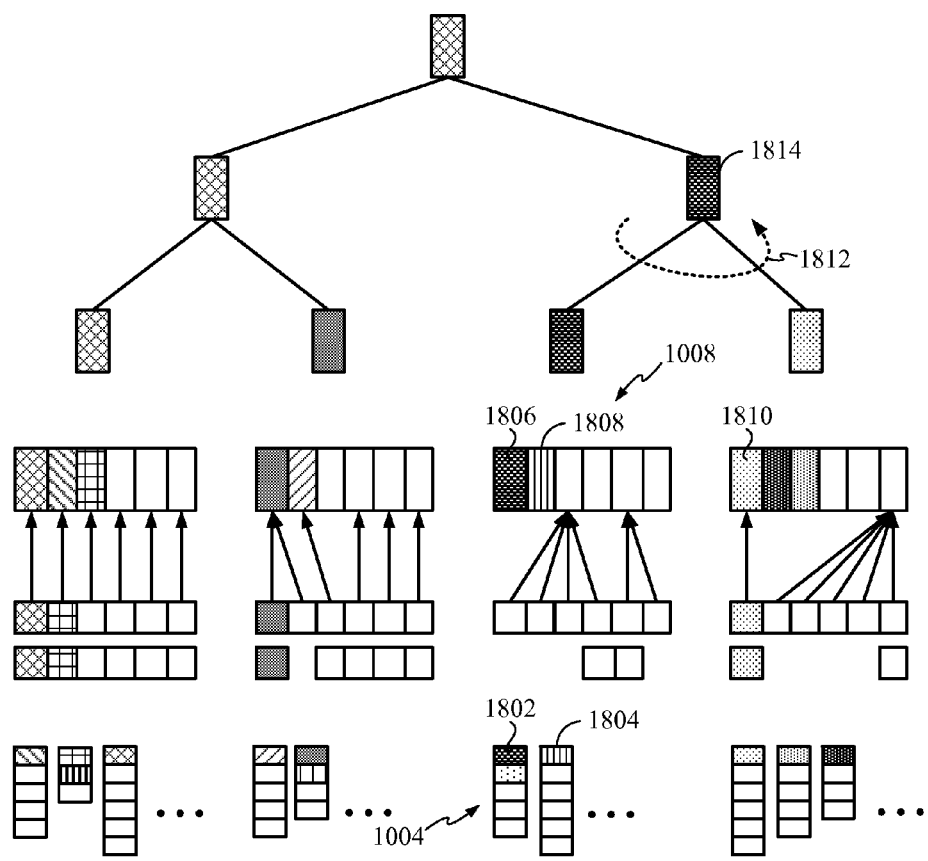
FIG. 18 illustrates inserting an example head lead event using the multilevel scheme of FIG. 10, in accordance with certain aspects of the present disclosure.

In FIG. 18, a new event 1802 is scheduled for a particular node 1002. Since this event 1802 is the earliest event 1006 for this node 1002, the list 1004 is re-sorted such that inserted event 1802 is the new earliest event. Since the lead event for this node is now different due to the inserted event 1802, the schedule 1008 for the unit 900 containing this node is also re-sorted. Because the new event 1802 occurs earlier than the earliest event 1804 for another node (which previously was the head lead event for this unit 900), the schedule 1008 is re-sorted such that entry 1806 (corresponding to new event 1802) becomes the new head lead event, prior to entry 1808 (corresponding to the previous head lead event (event 1804)). The vector entries may be shifted to match the sorting of the schedule 1008.

Furthermore, because the new event 1802 is the head lead event for this unit and occurs earlier than the head lead event (corresponding to entry 1810) for another unit in this branch of the binary tree 1010, the right part of the binary tree is re-sorted. This is accomplished by swapping the branches as indicated at 1812 (as has already been done in FIG. 18, updated from FIG. 10) and changing element 1814 of the binary tree 1010 to correspond to the entry 1806 (representing the earliest head lead event between the two units), rather than to the entry 1810.

Sorting/Partial Sorting/Earliest-Only Tracking/No Sorting

As mentioned above, schedules at different levels need not be kept sorted. One or more may be kept partially sorted or unsorted. Partial sorting constitutes keeping the earliest part of the schedule sorted or keeping events sorted to within a time margin until the events get close to occurring. This latter operation is favored at Level 2 when using the unsorted vectors because the vectors degrade over time. The amount of sorting time margin in the schedule may be maintained commensurate with the amount of degradation in the vector referencing.

Conditionally Regenerating Sparse Scheduling (Non-Sorting)

Scheduling involves insertion and deletion of events as well as rescheduling of events (deletion and then re-insertion). These tasks entail determination of the insertion or deletion point. In the latter case, the location of the item to be deleted may most likely be found. In the former case, the point of insertion may most likely be found. This point corresponds to the correct position for the item such that the schedule is sorted (before and after insertion and before deletion).

Linked lists are convenient for easy insertion and deletion of events. However, to search a linked list for an insertion or deletion point by conventional means typically involves starting at the beginning and moving forward through each item until the desired point is found. This can be very, very slow.

One aspect of the present disclosure includes searching in parallel from the front, back, and last insertion point(s). However, searching time may be reduced even further with a sparse scheduling vector.

A sparse scheduling vector takes advantage of the fact that the linked list of neurons in a unit is a fixed length (although this is not strictly required for certain aspects of the present disclosure). The vector contains references directly to the linked list entries (in software this could be C++ iterators or pointers). The vector may be initialized such that the $i^{th}$ entry in the vector references the $i^{th}$ entry in the linked list. This referencing situation is depicted in FIG. 19 by the arrows where the top row is a representation of a schedule 1008 (e.g., a linked list schedule) and the bottom rows represent the vector. There are two rows on the bottom representing the vector: one for the actual vector 1012 and one for the virtual vector 1014. However, for the moment, consider the two bottom rows as the same. Differences will be explained further below.

Searches for an entry in the schedule 1008 involve the following. Entries in the schedule 1008 correspond to lead events for each neuron in the unit. Entries may be ordered according to the time of their occurrence (e.g., earliest first). Since a lead event is for a particular neuron, entries are basically neurons (or events belonging to neurons). For a deletion, the search is for a particular neuron. Since the neuron is known, the time of the neuron's lead event is known. For an insertion of a lead event (i.e., a neuron), the search is for a point between two neurons which have lead event times that straddle the time of the lead event to be inserted (i.e., $t_1 \le t \le t_2$, where $t_1$ and $t_2$ are the lead event times of the two straddling neurons and t is the time of the new lead event to be inserted). Notice that if the insertion point is at the beginning, $t_1=0$ and if the insertion point is at the end $t_2=\infty$.

To accelerate the search for a neuron (lead event) in the schedule, the sparse vector may be used. Since the time of a neuron's lead event is known, a hash or fast search (e.g., an indexed binary search) of the vector may be used to directly find a vector entry with the given time without having to traverse the linked list at all.

To search for an insertion point for a neuron (a lead event) in the schedule, the sparse vector may also be used. Since the time of the lead event is known, the search is for an entry with that time or for entries with times that straddle that time. Again, a hash or fast search of the vector may be used to directly find the straddling entries without having to traverse the linked list at all. A fast search may consist of computing an approximation of where in the vector an entry with a particular time will be found by extrapolating or interpolating the position from the rate of change of the time of events in the vector. A first step may involve starting at the beginning of the vector and looking at the first two entries. If the time difference between the first two entries is 2 ms, then one may assume that to find an entry at time 10 ms, one should look 5 entries further ahead. Thus, one may jump directly to that entry. A second step may be performed if that entry reached is not the desired entry (i.e., has a different time). The second step involves looking at the rate of change (time difference) between the fifth entry and the next entry in the direction of the desired time (i.e., either the fourth or sixth entry). That difference may then be used to extrapolate the next position to which to jump.

After an entry with the desired time is found or two straddling entries are found, one may move to the linked list using the pointer(s). Note that it is not necessary to use only two adjacent entries to estimate the progression of time across the vector. For example, multiple entries may be used, non-adjacent entries may be used, an average rate may be tracked and used, or a rate may be determined in reverse based on the result of finding previous entries that were searched for. A rate (r) may be determined using any two entries 1 and 2 having times $t_1$ and $t_2$ that are M entries apart as follows $r=(t_2-t_1)/M$. The desired jump to entry with time t may then be determined to be N vector entries from entry 1 where $N=r(t-t_1)$.

However, acceleration becomes much more complicated as entries are inserted or deleted and the schedule changes. Because of this, the vector is changed, as well. Consider the case where one neuron's lead event changes (either because it was processed, rescheduled, a sooner event was scheduled for that neuron, etc.). In this case, the schedule may be rearranged because the new lead event for that neuron may have a different time of occurrence (e.g., sooner or later).

In the example of FIGS. 19 and 20, the old lead event 1602 of FIG. 19 is replaced with a new lead event 1704 for the same neuron in FIG. 20, but the new lead event 1704 has a later time than the replaced event 1602. The old lead event 1602 has been deleted from the schedule 1008, and the new lead event 1704 has been inserted later in the schedule 1008. Because of this, the vector references no longer correspond completely with the linked list entries (also shown by the arrows) as illustrated in FIG. 20. The actual vector 1012 has references that are now shifted to the right (middle portion) relative to the schedule 1008. Also, the entry pointing to the deleted old lead event 1602 may most likely be corrected (so it does not point to a non-existent entry). For certain aspects, this is a matter of setting the reference to the prior or subsequent entry in the linked list (referencing to the prior entry is shown in FIG. 20). Regardless, the effect is that the resulting virtual vector 1014 has one fewer entry than before.

As lead events change, the vector becomes more and more sparse. What is the implication of a sparse vector? Notice that the entry for the new lead event 1704 in the schedule 1008 has no direct reference from the vector. The nearest that a vector-based search or hash can get to the desired entry is the nearest referenced entry on either side. What this means is that a vector-based search or hash can get close to the entry, but a final search of the linked list schedule (although short) may also be implicated. After some time, the vector may be quite sparse, as illustrated in the example of FIG. 21, and thus offer limited help in the search.

Generally, an insertion/deletion involves finding an entry or entries in the schedule, which includes two tasks: (1) use the vector to quickly find the nearest entry or entries in the linked list; and (2) use the linked list to locate the entry (in the vicinity of the nearest entry or entries found in the first step). The first step is generally much faster than if the linked list had to be searched, even if the vector is sparse. However, as the vector gets very sparse, the acceleration may be limited.

Certain aspects of the present disclosure further include conditionally regenerating the vector (restoring a vector to whole). For example when the vector reaches a particular level of sparsity. However, according to certain aspects, the vector is regenerated depending on the cost of the second part of the insertion/deletion search (i.e., the search in the linked list). Alternatively, the vector may be regenerated depending on the number, frequency, or probability of additional searching implicated in the linked list (i.e., after finding the vicinity of the entry using the vector).

Moreover, for certain aspects, the acceleration may be adaptive. According to certain aspects, the threshold for rebuilding a vector (whether number of searches, sparseness, or any other suitable criterion) may be adjusted on-the-fly with simulation or network behavior, such as the co-pending event rate or complexity. For certain aspects, the following more abstract adaptation is used:

1. Use a first (reference) condition for regeneration.
2. Measure the run-time performance
3. Use a second (different) condition for regeneration.
4. Measure the run-time performance.
5. Compare the performance with the first (reference) condition to the performance with the second (different) condition.
6. Set the reference condition to the condition that had the best performance.

For certain aspects, the condition is a measure exceeding a scalar threshold. A first condition would thus be one threshold, and a second condition would be a different threshold. Variations on this adaptation algorithm include direction changes. For example, if performance increases with a decrease in threshold, then a further decrease may be attempted and vice versa.

Examples of suitable measures include number of deletions, number of searches of the linked-list, distance searched in the linked-list, etc. These numbers may also be expressed as ratios relative to (or otherwise dependent upon) the number of entries or neurons in the unit (in the schedule).

Model Operation (Anticipate & Advance) Execution Strategies

This section describes execution strategies according to certain aspects of the present disclosure. In general, model operations for anticipating new events and updating (jumping ahead) since a prior time are executed according to the algorithm described above. However, a number of optimizations or enhancements are possible.

Virtual Delay Synapse

FIG. 22 conceptually illustrates the synaptic delay 2202 between a pre-synaptic neuron 406 and a post-synaptic neuron 402, in accordance with certain aspects of the present disclosure. Consider first the case where the synaptic delay 2202 is zero. In this case, considering the algorithm described above, scheduling of an input event for the post-synaptic neuron 402 may be completely bypassed. The algorithm may jump directly to updating the post-synaptic neuron 402 and anticipating the next event (same for the synapse).

But what if a synapse has non-zero delay? Consider a few cases. First, if the delay 2202 is small, certain aspects of the present disclosure may ignore the delay and continue as if the delay was zero. The event may have a timing error, but this error may be "permissible." Second, consider if there is a probability of ignoring the delay depending on the delay magnitude or past history of the connection or post-synaptic neuron state. These and other variations are possible. Third, consider if the synaptic delay 2202 is ignored (assumed to be zero), but that this delay is compensated for in the post-synaptic neuron model advance. This third case is important. How can Assumption of Zero Synaptic Delay be Compensated for in the Post-Synaptic Neuron Model Advance?

The simulator can trick the model advance into thinking that the advance is for a time that is later than the actual time.

Figure 23:
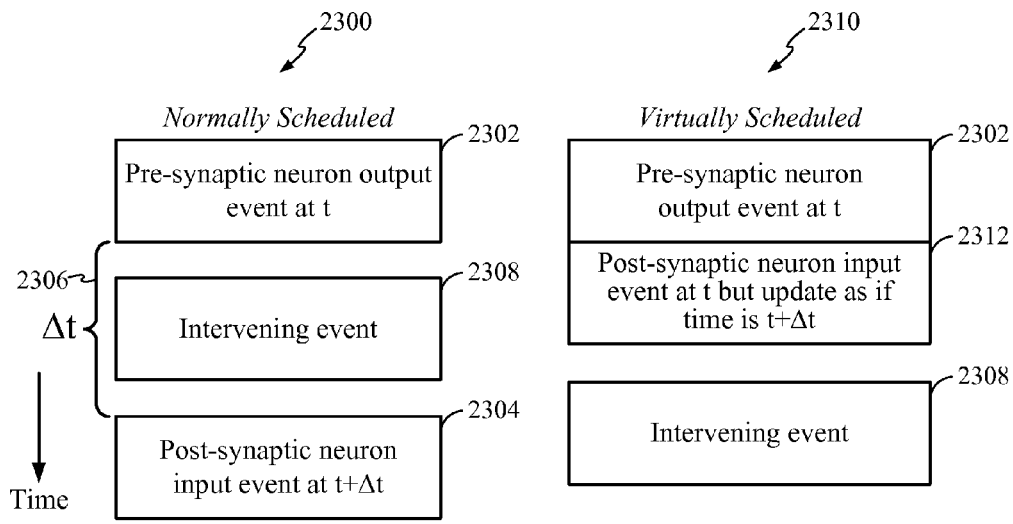
FIG. 23 illustrates how a previously intervening event between a pre-synaptic neuron's output event and the corresponding input event for the post-synaptic neuron may occur after a virtually scheduled post-synaptic neuron input event, in accordance with certain aspects of the present disclosure.

The difference is the synaptic delay. This trick allows model designers to design anticipate and advance rules for their models which take and return times (e.g., anticipated delay to spike or propagate to soma or advance model state by jumping ahead by a given amount of time, etc.). However, the simulation executes the advance, not for the time of the pre-synaptic neuron output event time (current simulation time), but for a future time equal to the current time plus the synaptic delay. Now, it is possible that the next simulation event occurs before that future time and that then events will be executed out of order. However, this can be tolerable. If the events are not inter-related there is no difference. If the events have little impact on receiving neurons alone, the difference may be little; timing differences on a small order may be of negligible importance. An example of virtual scheduling (treating synaptic delays as zero to avoid scheduling, but compensating by tricking the model) is shown in FIG. 23. Technically, it is possible that an intervening event may occur after, instead of before, the virtually scheduled event. However, this intervening event may be for another neuron or otherwise have no impact on the overall result, or the impact may be deemed "permissible."

FIG. 23 illustrates a comparison between normally scheduled operations 2300 and virtually scheduled operations 2310. In the normally scheduled operations 2300, a pre-synaptic neuron output event 2302 may occur at t, and a post-synaptic neuron input event 2304 may occur at t+$\Delta$t, due to the synaptic delay 2306 of $\Delta$t. During the synaptic delay 2306, an intervening event 2308 may occur. In the virtually scheduled operations 2310, the virtually scheduled post-synaptic neuron input event 2312 may be evaluated at t, but is updated as if the time was t+$\Delta$t. Thus, the intervening event 2308 may occur after the virtually scheduled post-synaptic neuron input event 2312, even though it would have occurred before the post-synaptic neuron input event 2304 in the normally scheduled operations 2300.

Now, consider also a special case. If there is an intervening event for the same neuron, then the model advance for that event may have a negative time difference relative to the last advance. To address this, the model advance may either be capable of bringing a model state backward (instead of jumping ahead, jumping back) in time or the difference may be ignored (assumed to be zero time elapsed, for example). This latter method may be employed when the maximum synaptic delay that is treated as zero for scheduling is limited.

Another variation for certain aspects includes an option to assume all synaptic delays are zero.

Advance Lag

Another way to compensate for synaptic delay is to have the model advance store future events (inputs) so that when the next (or some later) event occurs, multiple inputs may be processed together. The benefit is that scheduling is avoided. However, this alternative may implicate model design to handle this explicitly, whereas the above method does not.

A subtle variation is to queue up events for updating and handle them in a batch. The reason for this will be explained below.

Anticipation Lag

Consider the case where a neuron receives multiple inputs before spiking. In the event algorithms above, model anticipation of future neuron events is executed after model advance. This is because each input can change the anticipated time of output. This is generally true for all neuron models. Granted, for some simple neuron models, an input may not change the anticipated output time. For example, a leaky-integrate-and-fire (LIF) neuron may receive multiple inputs, and if all are below firing threshold, the anticipated output time (never, i.e., infinite) does not change. However, as one example, in the Simple Model of Izhikevich, a neuron spikes with some delay after the voltage exceeds a threshold. Moreover, the time delay until spike depends on the amount of input and when it occurs. Thus, each input after the neuron voltage exceeds threshold and before it spikes alters the anticipated spike (output) time.

As mentioned in the event algorithms above, model anticipation of future neuron events is executed after each model advance. Certain aspects of the present disclosure may include an optional anticipation lag feature. According to this feature, model advances are executed, but the model anticipation step is delayed. According to a variation, the anticipation step is delayed only under some conditions. Moreover, if a second or subsequent model advance occurs before the anticipation step for the first model advance (for the same neuron), then only one anticipation step may be performed. This saves computation of the model at the expense of possible late anticipation of an event. A further enhancement involves queuing up advance steps and executing them in a batch at the time of the delayed anticipation.

When does the Delayed Anticipation Determination Occur?

To determine the output event time, the simulation must execute the model anticipation rule. The anticipation is made based on the current state of the neuron (or synapse as may be the case). Thus, if multiple model advances occur before the anticipation, the anticipation may most likely be performed based on the final state as of the last advance. Thus, the anticipation lag feature option suggests that the model rules be consistent with this aspect.

Synaptic Failure and Learning

Certain aspects of the present disclosure include a provision for synaptic failure, which corresponds to failure of a synaptic input event to result in a synaptic output event (neuron input event). According to certain aspects, this feature is a counterpart determination of an anticipate method. For example, a synapse anticipation rule generally determines when (relative to the current time) in the future the synapse will output an event. However, this determination may also determine that there will never be an output corresponding to an input.

Details of determination of synaptic failure (such as probabilistic failure or deterministic failure based on conditions, factors, or parameters), are outside the scope of this disclosure. However, there are additional important aspects of the present disclosure which are related to synaptic failure and learning. To understand these aspects consider spike-timing-dependent plasticity (STDP). One way to implement STDP is to trigger long-term potentiation (LTP) based on a post-synaptic event and long-term depression (LTD) based on a pre-synaptic event. Both LTP and LTD depend on time difference between pre- and post-synaptic spikes. However, if a synaptic failure occurs and there is no post-synaptic events, then there may be no trigger for LTP, and thus, LTP may be diminished. Or the last post-synaptic time stamp may be incorrect for LTD, and thus, LTD effects may be incorrect. Post-synaptic time stamp problems may be avoided by tracking the time stamp in the neuron model rather than in the synapse model and either accessing the time stamp from the synapse rules determining STDP or determining STDP from the neuron model.

According to certain aspects of the present disclosure, some other options are available. First, the simulation may execute the synaptic advance rule event if the anticipation rule determines no output event will occur. In the alternative, a special advance rule may be executed. To avoid scheduling another event for this special purpose, the special advance rule (or ghost rule) may be either executed as if the current time is the (failed) output event time or the time of the (failed) output event may be communicated to the advance rule. This latter execution of the synaptic advance rule for the (failed) output event should not be confused with execution of the synaptic advance rule for the input event (pre-synaptic neuron output).

Figure 24:
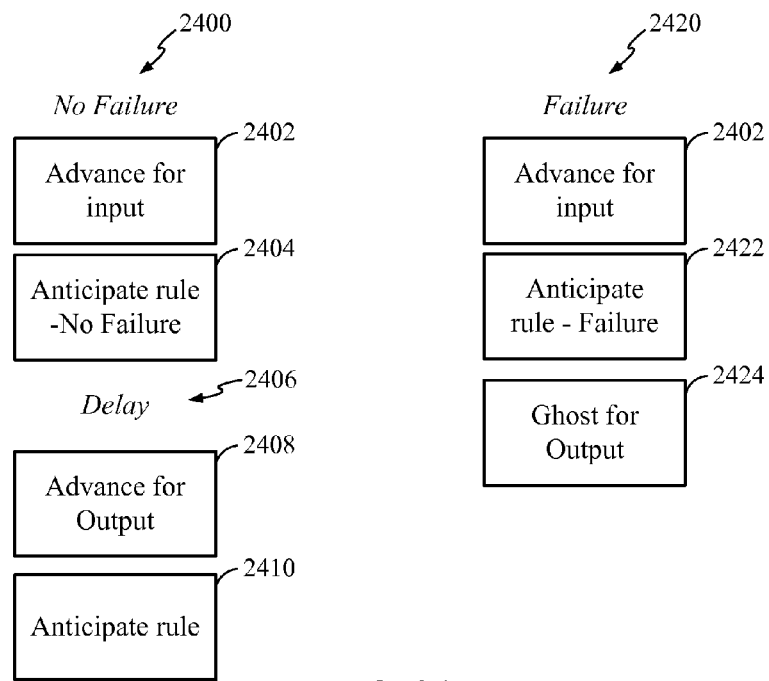
FIG. 24 is a comparison between modeling a synapse without failure and modeling a synapse with synaptic failure, in accordance with certain aspects of the present disclosure.

FIG. 24 is a comparison between operations 2400 for modeling a synapse without failure and operations 2420 for modeling a synapse with synaptic failure, in accordance with certain aspects of the present disclosure. In the operations 2400, after advancing the synapse's state for an input event at 2402, the synapse may anticipate the expected time for the output event at 2404, even if the anticipation rule determines no output event will occur (i.e., without synaptic failure). The synaptic delay may occur at 2406 before the synapse outputs the output event and advances the synapse's state at 2408 in response to the output event. At 2410, the synapse may anticipate the expected time for the output event again, given the advanced state determined at 2408.

In contrast, after advancing the synapse's state for an input event at 2402 in the operations 2420, the synapse may anticipate the expected time for the output event at 2422 with a synaptic failure feature. In this case, if the anticipation rule determines no output event will occur, a ghost rule may be executed at 2424.

Why would we want a Model that Learns from Failed Synaptic Events?

There is a difference between modeling a synaptic failure and determining a synaptic failure for computationally advantageous purposes. In the former case, one may not want to learn based on a modeled synaptic failure (as if the synaptic input had no effect in biology). In the latter case, the synapse might have succeeded in biology but one may be motivated to skip the event scheduling and processing associated with the event to save on computational complexity. For example, if the same high level network result can be achieved with probabilistic synaptic failures, one may be motivated to use this as a way to accelerate simulations.

Artificial Events (Future)

Certain aspects of the present disclosure provide a feature for advancing nodes at a minimum interval. Doing so ensures that an event-based model is updated at a minimum interval, even if there are no events.

This feature may be implemented using any of various suitable methods. In a first method, for example, an artificial event may be (re)scheduled after each input or output event with a particular delay. If another input or output event occurs sooner, the artificial event is rescheduled. Otherwise, the artificial event is processed (i.e., the synapse or neuron node is advanced) and rescheduled for a later time. Using a second implementation technique, an artificial event may occur periodically. In a third method, an artificial event may be triggered for a first node when a second node has an event. Referred to as the "proxy event artifice," this may occur even in situations where the first and second nodes are not connected.

Example Event Timing and Resolution

Certain aspects of the present disclosure allow arbitrarily fine timing resolution at no (or negligible) additional cost. However, this does not mean that a step-based simulation would necessarily achieve the same functional result if it could operate at the same fine timing resolution. There are two reasons. First, model dynamics according to certain aspects of the present disclosure are determined at event times, not by step updates. Second, no events handled by the same processing thread are processed at the same time. In a step-based simulation, typically all updates are batch processed before batch propagation of resulting events. For certain aspects, an event is scheduled immediately if an advance results in such an event. Thus, the order of execution of events is also potentially different. For other aspects, this may be changed so that events that occur at the same time are ordered by neuron or synapse index, for example.

Example Models and Operations

Figure 25:
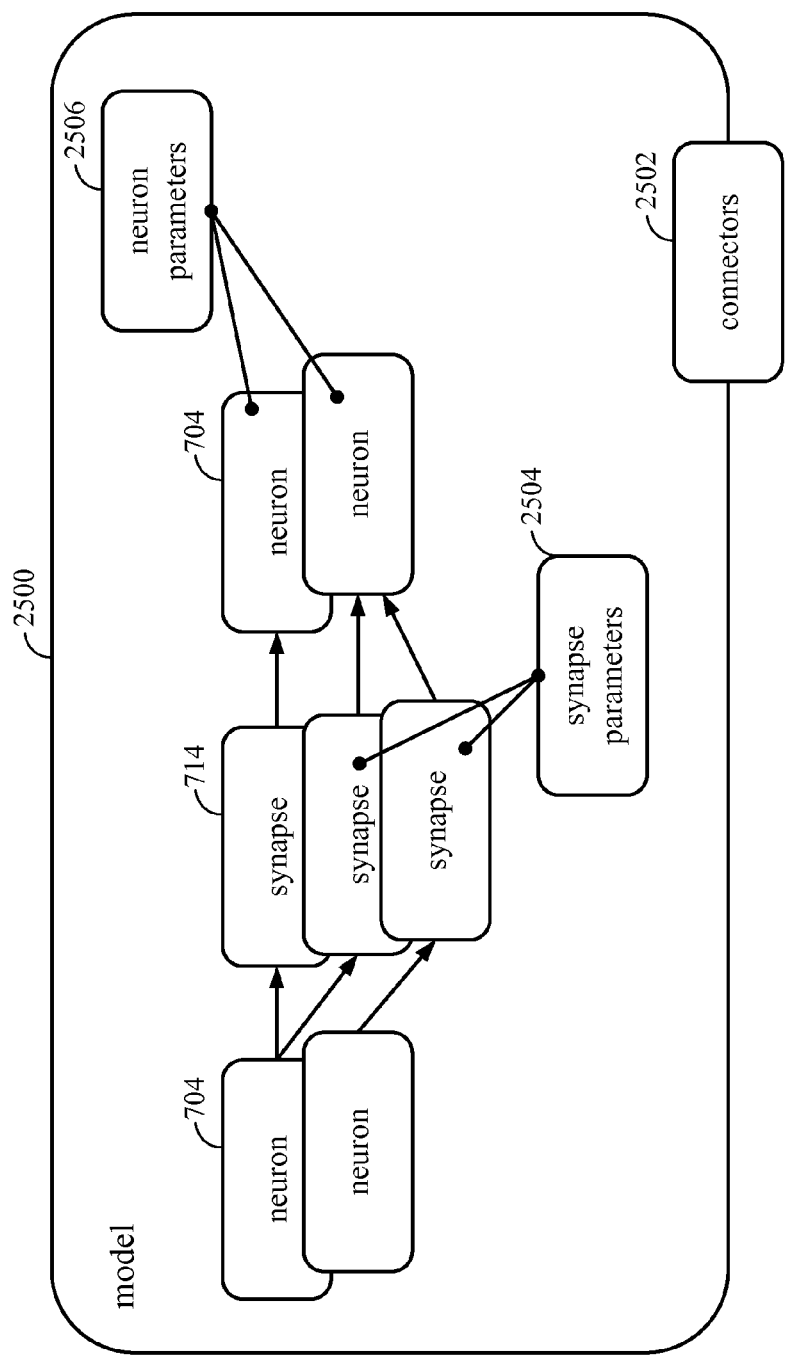
FIG. 25 illustrates an example neural network model including neuron, synapse, and connector models, in accordance with certain aspects of the present disclosure.

According to certain aspects of the present disclosure, neuron and synapse models 704, 714 also may have shared neuron parameter models 2506 and shared synapse parameter models 2504, respectively, as illustrated in FIG. 25. These parameter models 2504, 2506 may include both data (constants and variables), as well as methods (rules). Such parameter models may be used to define methods that are dependent on parameters that can be shared among a group (layer or common type) of neurons or synapses. Certain aspects of the present disclosure also include a network model (or simply "the model") 2500 and may include connector models 2502 (determining how to connect neurons with synapses). Models may also be derived from one another (inheritance).

Figure 26:
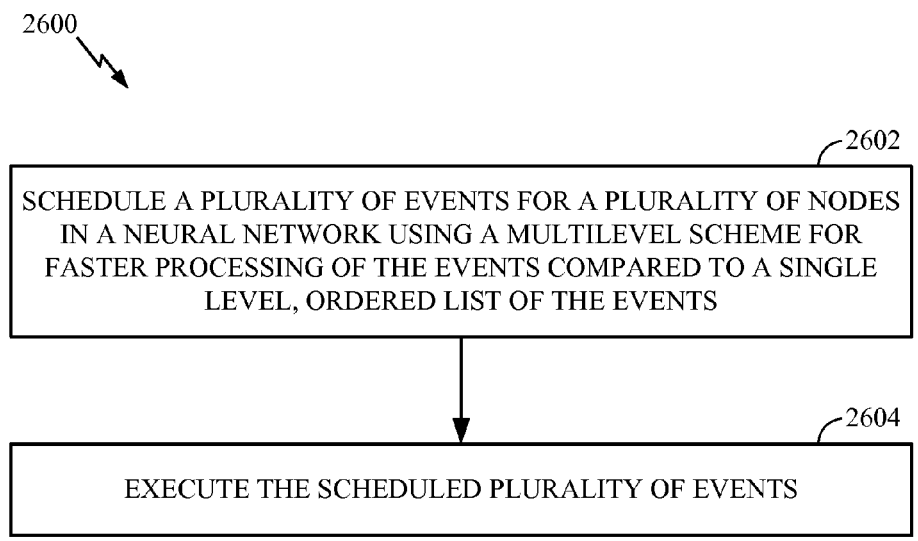
FIG. 26 is a flow diagram of example operations for event-based scheduling in neural networks, in accordance with certain aspects of the present disclosure.

FIG. 26 is a flow diagram of example operations 2600 for event-based scheduling in a spiking neural network, in accordance with certain aspects of the present disclosure. The operations 2600 may be performed in hardware (e.g., by one or more processing units), in software, or in firmware.

The operations 2600 may begin, at 2602, by scheduling a plurality of events for a plurality of nodes in a neural network. This scheduling may be performed using a multilevel scheme for faster processing of the events compared to a single level, ordered list of the events. For certain aspects, the plurality of nodes may include at least one of a plurality of neurons or a plurality of synapses. At 2604, the scheduled plurality of events may be executed.

For certain aspects, executing the scheduled plurality of events includes finding a next event in the scheduled plurality of events; advancing a state of a node associated with the next event based on the next event, wherein the node is one of the plurality of nodes; and determining when, if ever, an output event for the node is anticipated to occur based on the advanced state of the node. For certain aspects, the operations 2600 may further include rescheduling the output event for the node based on the determination. This rescheduling involves using the multilevel scheme (i.e., the multilevel processing/(re-)scheduling scheme).

For certain aspects, executing the scheduled plurality of events at 2604 includes finding a next event in the scheduled plurality of events. Finding the next event may include traversing levels in the multilevel scheme to determine the earliest event at each of the levels and determining the next event to be the earliest of all the events after traversing the levels.

According to certain aspects, a first level of the multilevel scheme includes an indexable list of the plurality of nodes. A second level of the multilevel scheme may comprise, for each node in the plurality of nodes, a schedule of co-pending events for the node. For certain aspects, the operations 2600 may further include determining the schedule of the co-pending events for a node in the plurality of nodes by addressing the node at the first level. The schedule of the co-pending events for the node may be at least partially sorted with the earliest of the co-pending events scheduled first. For certain aspects, the schedule of the co-pending events may comprise at most only one output event for the node.

For certain aspects, the operations 2600 may further include organizing the plurality of nodes into one or more units. This organizing may involve organizing the plurality of nodes into the units based on connection delays, such that first connection delays between the units are longer than second connection delays within the units.

For certain aspects, a third level of the multilevel scheme includes, for each of the units, the earliest of the co-pending events from each of the nodes in the unit. For certain aspects, a fourth level of the multilevel scheme comprises an organization based on the earliest of the co-pending events from each of the units. This organization may entail a binary tree. A root of this binary tree may be the earliest co-pending event out of all the scheduled plurality of events. For certain aspects, in the third level of the multilevel scheme, for each of the units, the earliest of the co-pending events from each of the nodes in the unit may be organized as a linked list. A fifth level of the multilevel scheme may include, for each of the units, a vector referencing the linked list. For certain aspects, the operations 2600 may further include rescheduling the scheduled plurality of events. This rescheduling may involve using the vector to find one or more entries in the linked list nearest a desired entry for an insertion or deletion from the scheduled plurality of events; and using the linked list to locate the desired entry based on the nearest one or more entries found.

Figure 27:
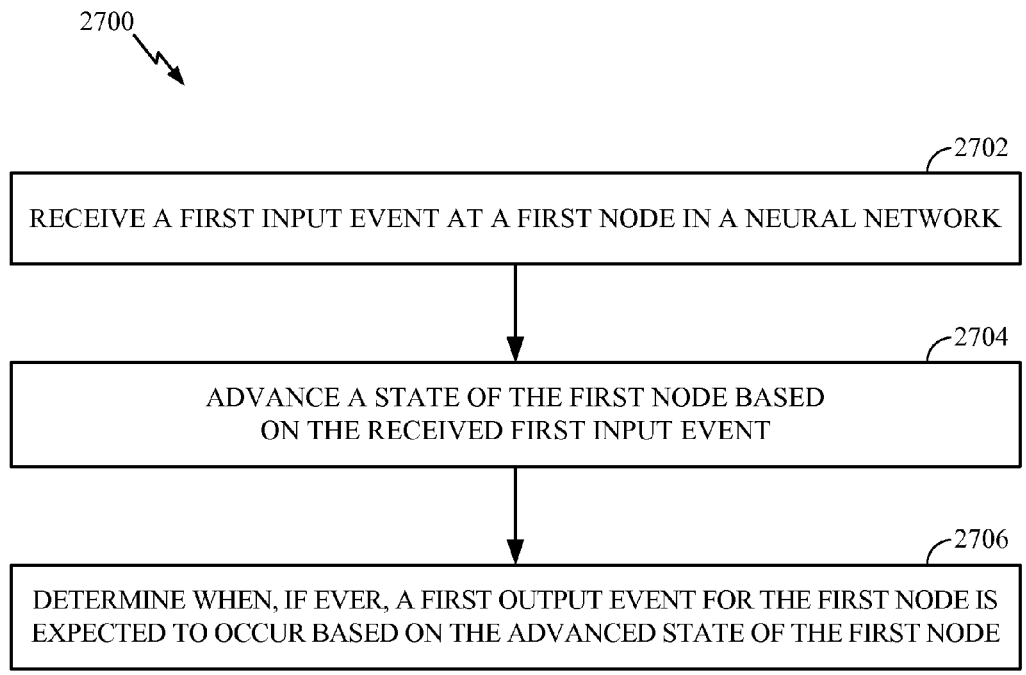
FIG. 27 is a flow diagram of example operations for continuous-time, event-based modeling in neural networks, in accordance with certain aspects of the present disclosure.
Figure 27A:
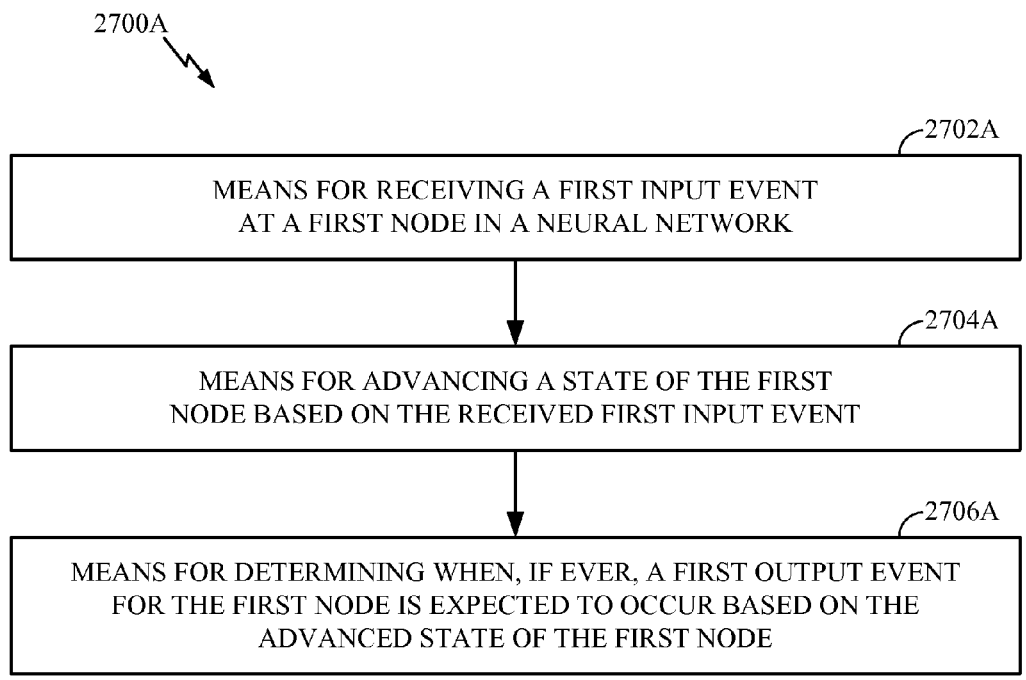
FIG. 27A illustrates example means capable of performing the operations shown in FIG. 27.

FIG. 27 is a flow diagram of example operations 2700 for continuous-time, event-based modeling in neural networks, in accordance with certain aspects of the present disclosure. The operations 2700 may be performed in hardware (e.g., by one or more processing units), in software, or in firmware.

The operations 2700 may begin, at 2702, by receiving a first input event at a first node in a neural network. At 2704, a state of the first node may be advanced, based on the received first input event from 2702. The state of the first node may be defined by a membrane potential and a recovery current of the first node. According to certain aspects, advancing the state of the first node includes processing the received first input event to adjust the state of the first node and jumping ahead to a time of the received first input event.

When, if ever, a first output event for the first node is expected to occur may be determined at 2706, based on the advanced state of the first node from 2704. For certain aspects, this determination is performed every time after the state of the first node is advanced. For other aspects, this determination may be delayed. In this case, a second input event may be received at the first node, where the second input event occurs subsequent to the first input event and prior to the delayed determination. The state of the first node may be advanced based on the received second input event after the state of the first node has been advanced based on the received first input event, but before the delayed determination. For certain aspects, advancing the state of the first node based on the received first and second input events includes: (1) queuing up the advancing the state of the first node based on the received first input event and the advancing the state of the first node based on the received second input event; and (2) executing the queued advancements at the time of the delayed determination.

According to certain aspects where the first node is a post-synaptic neuron, receiving the first input event at 2702 involves receiving a second output event from a second node. For certain aspects, the second node is a synapse having a delay. In this case, advancing the state of the first node at 2704 may include processing the received first input event to adjust the state of the first node and jumping ahead to a time of the received first input event plus the delay. For other aspects, the second node is a pre-synaptic neuron connected with the post-synaptic neuron via a synapse. In cases where the synapse has zero delay, a third output event for the synapse is not scheduled. In other cases where the synapse has a non-zero delay, the delay may be ignored, such that a third output event for the synapse is not scheduled, similar to the case with zero delay. For certain aspects, the synapse has a first delay, and at least a portion of the first delay is ignored, such that a third output event for the synapse is scheduled with a second delay. This covers the case, as a first example, where the synapse has a non-zero constant delay capability so that the scheduled processing is restricted to be at that delay or, as a second example, for scheduling the processing when there is other processing already scheduled and a particular delay is desired, where the delay difference is accounted for separately (i.e., by the processing when it occurs).

For certain aspects, the operations 2700 may further include storing the received first input event before advancing the state at 2704. Then, the first node may receive a second input event subsequent to the first event. In this case, advancing the state at 2704 may comprise processing the received first input event and the received second input event together.

According to certain aspects, the operations 2700 further include outputting the first output event from the first node according to the determination. Next, a second node may receive the first output event as a second input event, and a state of the second node may be advanced based on the received second input event. When, if ever, a second output event for the second node is expected to occur may then be determined, based on the advanced state of the second node.

For certain aspects where the first node is a synapse, the determination indicates that the first output event will never occur. In this case, the operations 2700 may further include advancing the state of the synapse based on the first output event that will never occur. A current time may be used as a time of the first output event that will never occur.

According to certain aspects, the first input event includes an artificial event for the first node. For certain aspects, the operations 2700 may further include scheduling the artificial event to occur periodically. For other aspects, the operations 2700 may further include scheduling the artificial event to occur if an amount of time has elapsed without an event for the first node. For certain aspects, the operations 2700 may further include scheduling the artificial event to occur after a delay following each input or output event occurrence, such that if no input or output event occurs within the delay, the artificial event occurs. In this case, the operations may also include (re)scheduling another artificial event to occur with another delay after the artificial event occurs.

Figure 28:
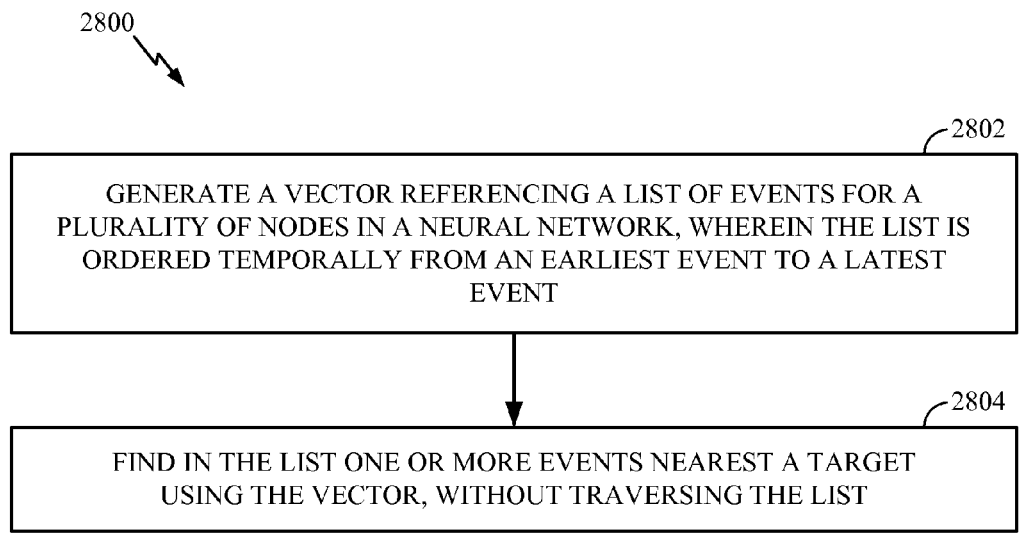
FIG. 28 is a flow diagram of example operations for using a vector to find one or more events in an event list, in accordance with certain aspects of the present disclosure.
Figure 28A:
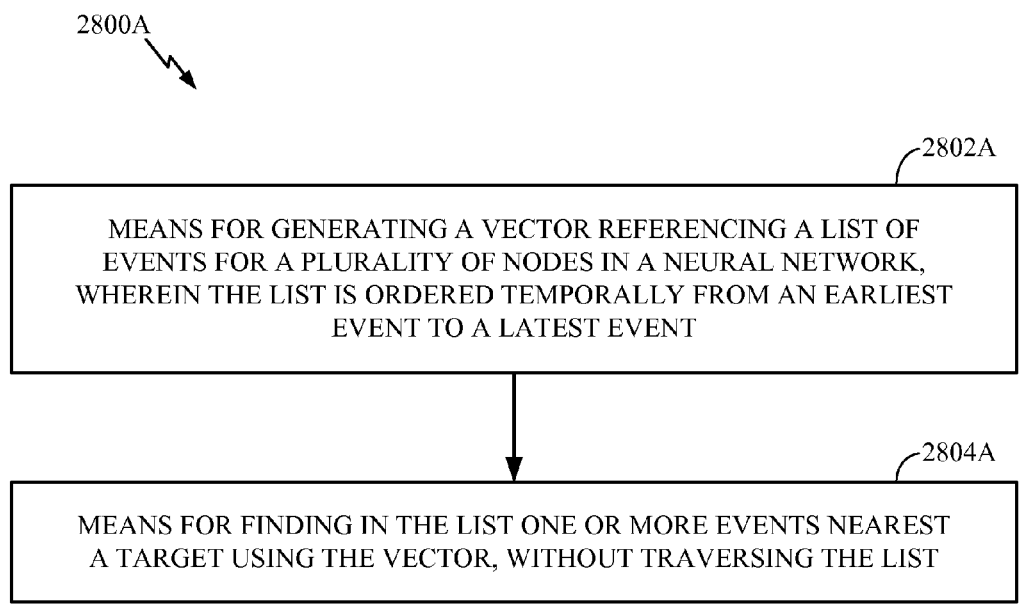
FIG. 28A illustrates example means capable of performing the operations shown in FIG. 28.

FIG. 28 is a flow diagram of example operations 2800 for using a vector to find one or more events in an event list, in accordance with certain aspects of the present disclosure. The operations 2800 may be performed in hardware (e.g., by one or more processing units), in software, or in firmware.

The operations 2800 may begin, at 2802, by generating a vector referencing a list of events for a plurality of nodes in a neural network. The list may be ordered temporally from an earliest event to a latest event. For certain aspects, the list includes the earliest event for each node in the plurality of nodes, arranged from the earliest event to the latest event. According to certain aspects, the $i^{th}$ entry in the vector references the $i^{th}$ entry in the list. For certain aspects, the list comprises a linked list, and the vector may be implemented with pointers to entries of the linked list.

At 2804, one or more events nearest a target may be found in the list of events using the vector. This search may be conducted without traversing the list of events. The target may comprise a target time or a target event, for example. For certain aspects, using the vector may involve performing an indexed binary search of the vector. For other aspects, using the vector may involve performing interpolation or extrapolation based on time entries in the vector.

According to certain aspects, the operations 2800 may further include deleting an event from the list at the target or inserting an event into the list between the one or more events nearest the target. Then, the vector may be updated based on the deleted or inserted event. For certain aspects, updating the vector based on the deleted event includes referencing an entry prior to (or subsequent to) the deleted event in the list.

The operations 2800 may further include regenerating the vector if a threshold is met. For certain aspects, the threshold may be dynamically adjusted (i.e., adjusted on-the-fly). The threshold may be, for example, a number of searches for the target, a number of updates to the vector, a number of deletions from the list, a cost of searching the list after finding the nearest one or more events, or a sparsity of a virtual vector. This virtual vector may mirror the generated vector (i.e., mirroring the vector after initialization or regeneration) and may be formed by removing entries of the virtual vector corresponding to events deleted from the list.

Figure 26A:
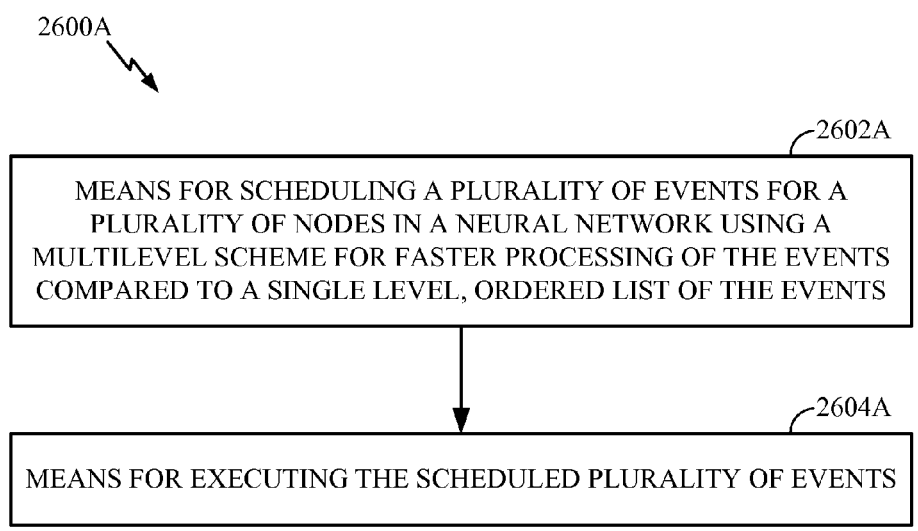
FIG. 26A illustrates example means capable of performing the operations shown in FIG. 26.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 2600 illustrated in FIG. 26 correspond to means 2600A illustrated in FIG. 26A.

For example, the means for displaying may comprise a display (e.g., a monitor, flat screen, touch screen, and the like), a printer, or any other suitable means for outputting data for visual depiction, such as a table, chart, or graph. The means for processing, means for receiving, means for scheduling, means for rescheduling, means for executing, means for advancing, means for updating, means for generating, means for regenerating, means for finding, means for adjusting, means for deleting, means for organizing, means for delaying, means for outputting, means for providing, or means for determining may comprise a processing system, which may include one or more processors or processing units. The means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for neural networks, comprising:
    scheduling a plurality of events for a plurality of nodes in a neural network using a multilevel scheme for faster processing of the events compared to a single level, ordered list of the events, wherein:
        a first level of the multilevel scheme comprises an indexable list of the plurality of nodes; and
        a second level of the multilevel scheme comprises, for each node in the plurality of nodes, a schedule of co-pending events for the node; and
    executing the scheduled plurality of events.

2. The method of claim 1, wherein executing the scheduled plurality of events comprises:
finding a next event in the scheduled plurality of events;
advancing a state of a node associated with the next event based on the next event, wherein the node is one of the plurality of nodes; and
determining when, if ever, an output event for the node is anticipated to occur based on the advanced state of the node.

3. The method of claim 2, further comprising rescheduling the output event for the node based on the determination, wherein the rescheduling comprises using the multilevel scheme.

4. The method of claim 1, wherein executing the scheduled plurality of events comprises finding a next event in the scheduled plurality of events, wherein finding the next event comprises:
traversing levels in the multilevel scheme to determine the earliest event at each of the levels; and
determining the next event to be the earliest of all the events after traversing the levels.

5. The method of claim 1, further comprising determining the schedule of the co-pending events for a node in the plurality of nodes by addressing the node at the first level.

6. The method of claim 1, wherein the schedule of the co-pending events for the node is at least partially sorted with the earliest of the co-pending events scheduled first.

7. The method of claim 1, wherein the schedule of the co-pending events comprises at most only one output event for the node.

8. The method of claim 1, further comprising organizing the plurality of nodes into one or more units.

9. The method of claim 8, wherein the organizing comprises organizing the plurality of nodes into the units based on connection delays, such that first connection delays between the units are longer than second connection delays within the units.

10. The method of claim 8, wherein a third level of the multilevel scheme comprises, for each of the units, the earliest of the co-pending events from each of the nodes in the unit.

11. The method of claim 10, wherein a fourth level of the multilevel scheme comprises an organization based on the earliest of the co-pending events from each of the units.

12. The method of claim 11, wherein the organization comprises a binary tree and wherein a root of the binary tree comprises the earliest co-pending event out of all the scheduled plurality of events.

13. The method of claim 11, wherein in the third level of the multilevel scheme, for each of the units, the earliest of the co-pending events from each of the nodes in the unit are organized as a linked list and wherein a fifth level of the multilevel scheme comprises, for each of the units, a vector referencing the linked list.

14. The method of claim 13, further comprising rescheduling the scheduled plurality of events, wherein the rescheduling comprises:
using the vector to find one or more entries in the linked list nearest a desired entry for an insertion or deletion from the scheduled plurality of events; and
using the linked list to locate the desired entry based on the nearest one or more entries found.

15. The method of claim 1, wherein the plurality of nodes comprises at least one of a plurality of neurons or a plurality of synapses.

16. An apparatus for neural networks, comprising:
a processing system configured to:
schedule a plurality of events for a plurality of nodes in a neural network using a multilevel scheme for faster processing of the events compared to a single level, ordered list of the events, wherein:
a first level of the multilevel scheme comprises an indexable list of the plurality of nodes; and
a second level of the multilevel scheme comprises, for each node in the plurality of nodes, a schedule of co-pending events for the node; and
execute the scheduled plurality of events.

17. The apparatus of claim 16, wherein the processing system is configured to execute the scheduled plurality of events by:
finding a next event in the scheduled plurality of events;
advancing a state of a node associated with the next event based on the next event, wherein the node is one of the plurality of nodes; and
determining when, if ever, an output event for the node is anticipated to occur based on the advanced state of the node.

18. The apparatus of claim 17, wherein the processing system is further configured to reschedule the output event for the node based on the determination, wherein the rescheduling comprises using the multilevel scheme.

19. The apparatus of claim 16, wherein the processing system is configured to execute the scheduled plurality of events by finding a next event in the scheduled plurality of events, wherein finding the next event comprises:
traversing levels in the multilevel scheme to determine the earliest event at each of the levels; and
determining the next event to be the earliest of all the events after traversing the levels.

20. The apparatus of claim 16, wherein the processing system is further configured to determine the schedule of the co-pending events for a node in the plurality of nodes by addressing the node at the first level.

21. The apparatus of claim 16, wherein the schedule of the co-pending events for the node is at least partially sorted with the earliest of the co-pending events scheduled first.

22. The apparatus of claim 16, wherein the schedule of the co-pending events comprises at most only one output event for the node.

23. The apparatus of claim 16, wherein the processing system is further configured to organize the plurality of nodes into one or more units.

24. The apparatus of claim 23, wherein the processing system is configured to organize the plurality of nodes into the units based on connection delays, such that first connection delays between the units are longer than second connection delays within the units.

25. The apparatus of claim 23, wherein a third level of the multilevel scheme comprises, for each of the units, the earliest of the co-pending events from each of the nodes in the unit.

26. The apparatus of claim 25, wherein a fourth level of the multilevel scheme comprises an organization based on the earliest of the co-pending events from each of the units.

27. The apparatus of claim 26, wherein the organization comprises a binary tree and wherein a root of the binary tree comprises the earliest co-pending event out of all the scheduled plurality of events.

28. The apparatus of claim 26, wherein in the third level of the multilevel scheme, for each of the units, the earliest of the co-pending events from each of the nodes in the unit are organized as a linked list and wherein a fifth level of the multilevel scheme comprises, for each of the units, a vector referencing the linked list.

29. The apparatus of claim 28, wherein the processing system is further configured to reschedule the scheduled plurality of events by:
using the vector to find one or more entries in the linked list nearest a desired entry for an insertion or deletion from the scheduled plurality of events; and
using the linked list to locate the desired entry based on the nearest one or more entries found.

30. The apparatus of claim 16, wherein the plurality of nodes comprises at least one of a plurality of neurons or a plurality of synapses.

31. An apparatus for neural networks, comprising:
means for scheduling a plurality of events for a plurality of nodes in a neural network using a multilevel scheme for faster processing of the events compared to a single level, ordered list of the events, wherein:
a first level of the multilevel scheme comprises an indexable list of the plurality of nodes; and
a second level of the multilevel scheme comprises, for each node in the plurality of nodes, a schedule of co-pending events for the node; and
means for executing the scheduled plurality of events.

32. The apparatus of claim 31, wherein the means for executing the scheduled plurality of events is configured to:
find a next event in the scheduled plurality of events;
advance a state of a node associated with the next event based on the next event, wherein the node is one of the plurality of nodes; and
determine when, if ever, an output event for the node is anticipated to occur based on the advanced state of the node.

33. The apparatus of claim 32, further comprising means for rescheduling the output event for the node based on the determination, wherein the means for rescheduling is configured to use the multilevel scheme.

34. The apparatus of claim 31, wherein the means for executing the scheduled plurality of events is configured to find a next event in the scheduled plurality of events by:
traversing levels in the multilevel scheme to determine the earliest event at each of the levels; and
determining the next event to be the earliest of all the events after traversing the levels.

35. The apparatus of claim 31, further comprising means for determining the schedule of the co-pending events for a node in the plurality of nodes by addressing the node at the first level.

36. The apparatus of claim 31, wherein the schedule of the co-pending events for the node is at least partially sorted with the earliest of the co-pending events scheduled first.

37. The apparatus of claim 31, wherein the schedule of the co-pending events comprises at most only one output event for the node.

38. The apparatus of claim 31, further comprising means for organizing the plurality of nodes into one or more units.

39. The apparatus of claim 38, wherein the means for organizing is configured to organize the plurality of nodes into the units based on connection delays, such that first connection delays between the units are longer than second connection delays within the units.

40. The apparatus of claim 38, wherein a third level of the multilevel scheme comprises, for each of the units, the earliest of the co-pending events from each of the nodes in the unit.

41. The apparatus of claim 40, wherein a fourth level of the multilevel scheme comprises an organization based on the earliest of the co-pending events from each of the units.

42. The apparatus of claim 41, wherein the organization comprises a binary tree and wherein a root of the binary tree comprises the earliest co-pending event out of all the scheduled plurality of events.

43. The apparatus of claim 41, wherein in the third level of the multilevel scheme, for each of the units, the earliest of the co-pending events from each of the nodes in the unit are organized as a linked list and wherein a fifth level of the multilevel scheme comprises, for each of the units, a vector referencing the linked list.

44. The apparatus of claim 43, further comprising means for rescheduling the scheduled plurality of events by:
using the vector to find one or more entries in the linked list nearest a desired entry for an insertion or deletion from the scheduled plurality of events; and
using the linked list to locate the desired entry based on the nearest one or more entries found.

45. The apparatus of claim 31, wherein the plurality of nodes comprises at least one of a plurality of neurons or a plurality of synapses.

46. A computer program product for neural networks, comprising a computer-readable medium comprising instructions executable to:
schedule a plurality of events for a plurality of nodes in a neural network using a multilevel scheme for faster processing of the events compared to a single level, ordered list of the events, wherein:
a first level of the multilevel scheme comprises an indexable list of the plurality of nodes; and
a second level of the multilevel scheme comprises, for each node in the plurality of nodes, a schedule of co-pending events for the node; and
execute the scheduled plurality of events.

47. The computer program product of claim 46, wherein executing the scheduled plurality of events comprises:
finding a next event in the scheduled plurality of events;
advancing a state of a node associated with the next event based on the next event, wherein the node is one of the plurality of nodes; and
determining when, if ever, an output event for the node is anticipated to occur based on the advanced state of the node.

48. The computer program product of claim 47, further comprising instructions executable to reschedule the output event for the node based on the determination by using the multilevel scheme.

49. The computer program product of claim 46, wherein executing the scheduled plurality of events comprises finding a next event in the scheduled plurality of events, wherein finding the next event comprises:
traversing levels in the multilevel scheme to determine the earliest event at each of the levels; and
determining the next event to be the earliest of all the events after traversing the levels.

50. The computer program product of claim 46, further comprising instructions executable to determine the schedule of the co-pending events for a node in the plurality of nodes by addressing the node at the first level.

51. The computer program product of claim 46, wherein the schedule of the co-pending events for the node is at least partially sorted with the earliest of the co-pending events scheduled first.

52. The computer program product of claim 46, wherein the schedule of the co-pending events comprises at most only one output event for the node.

53. The computer program product of claim 46, further comprising instructions executable to organize the plurality of nodes into one or more units.

54. The computer program product of claim 53, wherein the organizing comprises organizing the plurality of nodes into the units based on connection delays, such that first connection delays between the units are longer than second connection delays within the units.

55. The computer program product of claim 53, wherein a third level of the multilevel scheme comprises, for each of the units, the earliest of the co-pending events from each of the nodes in the unit.

56. The computer program product of claim 55, wherein a fourth level of the multilevel scheme comprises an organization based on the earliest of the co-pending events from each of the units.

57. The computer program product of claim 56, wherein the organization comprises a binary tree and wherein a root of the binary tree comprises the earliest co-pending event out of all the scheduled plurality of events.

58. The computer program product of claim 56, wherein in the third level of the multilevel scheme, for each of the units, the earliest of the co-pending events from each of the nodes in the unit are organized as a linked list and wherein a fifth level of the multilevel scheme comprises, for each of the units, a vector referencing the linked list.

59. The computer program product of claim 58, further comprising instructions executable to reschedule the scheduled plurality of events by:
   using the vector to find one or more entries in the linked list nearest a desired entry for ar insertion or deletion from the scheduled plurality of events; and
   using the linked list to locate the desired entry based on the nearest one or more entries found.

60. The computer program product of claim 46, wherein the plurality of nodes comprises at least one of a plurality of neurons or a plurality of synapses.

* * * * *